(12) United States Patent
Manolakos et al.

(10) Patent No.: US 11,121,739 B2
(45) Date of Patent: Sep. 14, 2021

(54) SOUNDING REFERENCE SIGNAL (SRS) CONFIGURATIONS FOR ONE OR MORE FREQUENCY HOPS

(71) Applicant: QUALCOMM Incorporated, San Diego, CA (US)

(72) Inventors: Alexandros Manolakos, San Diego, CA (US); Sony Akkarakaran, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/910,607

(22) Filed: Jun. 24, 2020

(65) Prior Publication Data

US 2021/0105040 A1 Apr. 8, 2021

Related U.S. Application Data

(60) Provisional application No. 62/910,383, filed on Oct. 3, 2019.

(51) Int. Cl.
*H04J 13/00* (2011.01)
*H04B 1/713* (2011.01)
(Continued)

(52) U.S. Cl.
CPC .......... *H04B 1/713* (2013.01); *H04L 5/0007* (2013.01); *H04L 5/0048* (2013.01); *H04W 72/0453* (2013.01); *H04J 13/0062* (2013.01)

(58) Field of Classification Search
CPC ... H04L 5/0048; H04L 5/0053; H04L 5/0051; H04L 5/001; H04L 5/0091; H04L 5/0094;
(Continued)

(56) References Cited

U.S. PATENT DOCUMENTS

| 8,537,876 | B2 * | 9/2013 | Hooli | H04L 5/0048 375/133 |
| 2011/0310931 | A1 * | 12/2011 | Mehta | H01Q 3/24 375/133 |

(Continued)

FOREIGN PATENT DOCUMENTS

WO 2018199696 A1 11/2018

OTHER PUBLICATIONS

Huawei et al., "SRS Design for NR Positioning", 3GPP Draft, 3GPP TSG RAN WG1 Meeting #98, R1-1908115, 3RD Generation Partnership Project (3GPP), Mobile Competence Centre, 650, Route Des Lucioles, F-06921 Sophia-Antipolis Cedex, France, vol. RAN WG1. No. Prague. Czech Republic, 20190826-20190830 Aug. 17, 2019 (Aug. 17, 2019), XP051764735, 13 Pages, Retrieved from the Internet: URL:http://www.3gpp.org/ftp/tsg_ran/WG1_RL1/TSGR1_98/Docs/R1-1908115.zip [retrieved on Aug. 17, 2019] Section 2.1. 2.9.

(Continued)

*Primary Examiner* — Eva Y Puente
(74) *Attorney, Agent, or Firm* — Thien T. Nguyen

(57) ABSTRACT

In an aspect, a UE receives an SRS configuration that indicates, for at least one frequency hop, an allocation of less than all subcarriers of a sounding bandwidth to SRS per OFDM symbol in a respective frequency hop. The UE transmits, to a BS in a first frequency hop, OFDM symbols with SRS across all subcarriers of a first sounding bandwidth associated with the first frequency hop. In another aspect, the UE receives an SRS configuration that indicates, for frequency hops associated with the same comb-type, a sequence of resource element offsets that is based on a number of OFDM symbols used in the respective frequency hop. The UE transmits OFDM symbols with SRS in accordance with the sequence of resource element offsets indi- (Continued)

cated by the SRS configuration for the respective frequency hop.

40 Claims, 19 Drawing Sheets

(51) Int. Cl.
*H04W 72/04* (2009.01)
*H04L 5/00* (2006.01)

(58) Field of Classification Search
CPC ....... H04L 5/0012; H04L 5/0023; H04L 5/14; H04L 5/0007; H04L 5/0055; H04L 1/08; H04L 1/1812; H04L 1/1822; H04L 27/2613; H04L 5/0057; H04L 25/0226; H04L 27/2605; H04W 72/042; H04W 72/0413; H04W 72/0446; H04W 28/18; H04W 52/146; H04W 72/14; H04W 88/02; H04W 72/0406; H04W 72/0453; H04W 48/16; H04W 28/06; H04W 48/08; H04W 72/04; H04W 72/1289; H04W 52/325; H04W 56/0005; H04W 74/004; H04W 16/14; H04B 1/713; H04B 7/0413; H04B 7/0606; H04B 2201/698; H04B 7/0617; H04B 7/0684; H04B 7/0626; H04B 1/7143; H04B 7/0417; H04B 7/0608; H04B 7/0613; H04B 7/0695; H04B 7/15557; H04B 7/2656; H04B 1/715; H04B 7/024; H04B 7/04
USPC .......................................... 375/133; 370/252
See application file for complete search history.

(56) References Cited

U.S. PATENT DOCUMENTS

| | | | |
|---|---|---|---|
| 2014/0003262 A1* | 1/2014 | He | H04L 1/1812 370/252 |
| 2019/0053287 A1* | 2/2019 | Lin | H04W 74/0833 |
| 2019/0158164 A1* | 5/2019 | Kishiyama | H04W 72/042 |
| 2020/0178092 A1* | 6/2020 | Ren | H04W 24/02 |
| 2020/0204316 A1* | 6/2020 | Zhang | H04L 5/0051 |
| 2020/0313932 A1* | 10/2020 | Sun | H04L 27/2613 |
| 2020/0350970 A1* | 11/2020 | Liu | H04L 27/2613 |

OTHER PUBLICATIONS

International Search Report and Written Opinion—PCT/US2020/049734—ISA/EPO—dated Dec. 14, 2020.

* cited by examiner

| Comb/symbols | 2 | 4 | 8 | 12 |
|---|---|---|---|---|
| 2 | R=1, B=1 | R=1, B=2<br>R=2, B=1 | R=1, B=4<br>R=2, B=2<br>R=4, B=1 | R=1, B=6<br>R=2, B=3<br>R=3, B=2<br>R=6, B=1 |
| 4 | X | R=1, B=1 | R=1, B=2<br>R=2, B=1 | R=1, B=3<br>R=3, B=1 |
| 8 | X | X | R=1, B=1 | (Special Case) |

2000 ⟶

```
┌─────────────────────────────────────────────────────────────────┐
│ Transmitting, to a user equipment (UE), a sounding reference     │
│ signal (SRS) configuration that indicates, for at least one      │
│ frequency hop, an allocation of less than all subcarriers of a   │─ 2010
│ sounding bandwidth to SRS per orthogonal frequency division      │
│ multiplexing (OFDM) symbol in a respective frequency hop         │
└─────────────────────────────────────────────────────────────────┘
                                  ↓
┌─────────────────────────────────────────────────────────────────┐
│ Receiving, from the UE in a first frequency hop, a first         │
│ plurality of OFDM symbols with at least one SRS across all       │─ 2020
│ subcarriers of a first sounding bandwidth associated with the    │
│ first frequency hop                                              │
└─────────────────────────────────────────────────────────────────┘
                                  ↓
┌ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐
│ Receiving, from the UE in a second frequency hop, a second       │
│ plurality of OFDM symbols with at least one SRS across all       │─ 2030
│ subcarriers of a second sounding bandwidth associated with the   │
│ second frequency hop                                             │
└ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘
```

```
┌─────────────────────────────────────────────────────────────┐
│ Receiving, from a network entity, a sounding reference       │
│ signal (SRS) configuration that indicates, for each of a     │
│ plurality of frequency hops associated with the same        │── 2110
│ comb-type, a sequence of resource element offset that is    │
│ based on a number of orthogonal frequency division          │
│ multiplexing (OFDM) symbols used in the respective          │
│ frequency hop                                                │
└─────────────────────────────────────────────────────────────┘
                              │
                              ▼
┌─────────────────────────────────────────────────────────────┐
│ Transmitting, in each of the plurality of frequency hops,   │
│ a plurality of consecutive OFDM symbols with at least one   │── 2120
│ SRS in accordance with the sequence of resource element     │
│ offsets indicated by the SRS configuration for the          │
│ respective frequency hop                                     │
└─────────────────────────────────────────────────────────────┘
                              │
                              ▼
```

Transmitting, to a user equipment (UE), a sounding reference signal (SRS) configuration that indicates, for each of a plurality of frequency hops associated with the same comb-type, a sequence of resource element offsets that is based on a number of orthogonal frequency division multiplexing (OFDM) symbols used in the respective frequency hop — 2210

Receiving, from the UE in each of the plurality of frequency hops, a plurality of consecutive OFDM symbols with at least one SRS in accordance with the sequence of resource element offsets indicated by the SRS configuration for the respective frequency hop — 2220

*FIG. 22*

SOUNDING REFERENCE SIGNAL (SRS) CONFIGURATIONS FOR ONE OR MORE FREQUENCY HOPS

CROSS-REFERENCE TO RELATED APPLICATIONS

The present application for patent claims the benefit of Provisional Patent Application No. 62/910,383 entitled "CONFIGURATION OF REPETITION FACTOR AND HOPPING FOR SOUNDING REFERENCE SIGNALS (SRS) FOR POSITIONING" filed Oct. 3, 2019, and assigned to the assignee hereof and hereby expressly incorporated herein by reference in its entirety.

BACKGROUND OF THE DISCLOSURE

1. Field of the Disclosure

Aspects of the disclosure relate generally to wireless communications and more particularly to sounding reference signal (SRS) configuration and SRS use.

2. Description of the Related Art

Wireless communication systems have developed through various generations, including a first-generation analog wireless phone service (1G), a second-generation (2G) digital wireless phone service (including interim 2.5G networks), a third-generation (3G) high speed data, Internet-capable wireless service and a fourth-generation (4G) service (e.g., LTE or WiMax). There are presently many different types of wireless communication systems in use, including cellular and personal communications service (PCS) systems. Examples of known cellular systems include the cellular Analog Advanced Mobile Phone System (AMPS), and digital cellular systems based on code division multiple access (CDMA), frequency division multiple access (FDMA), time division multiple access (TDMA), the Global System for Mobile access (GSM) variation of TDMA, etc.

A fifth generation (5G) wireless standard, referred to as New Radio (NR), enables higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large wireless deployments. Consequently, the spectral efficiency of 5G mobile communications should be significantly enhanced compared to the current 4G standard. Furthermore, signaling efficiencies should be enhanced and latency should be substantially reduced compared to current standards.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

An aspect is directed to a method of wireless communication performed by a user equipment (UE), comprising receiving, from a network entity, a sounding reference signal (SRS) configuration that indicates, for at least one frequency hop, an allocation of less than all subcarriers of a sounding bandwidth to SRS per orthogonal frequency division multiplexing (OFDM) symbol in a respective frequency hop, and transmitting, in a first frequency hop in accordance with the SRS configuration, a first plurality of OFDM symbols with at least one SRS across all subcarriers of a first sounding bandwidth associated with the first frequency hop.

Another aspect is directed to a method of wireless communication performed by a base station (BS), comprising transmitting, to a user equipment (UE), a sounding reference signal (SRS) configuration that indicates, for at least one frequency hop, an allocation of less than all subcarriers of a sounding bandwidth to SRS per orthogonal frequency division multiplexing (OFDM) symbol in a respective frequency hop, and receiving, from the UE in a first frequency hop, a first plurality of OFDM symbols with at least one SRS across all subcarriers of a first sounding bandwidth associated with the first frequency hop.

Another aspect is directed to a method of wireless communication performed by a user equipment (UE), comprising receiving, from a network entity, a sounding reference signal (SRS) configuration that indicates, for each of a plurality of frequency hops associated with the same comb-type, a sequence of resource element offsets that is based on a number of orthogonal frequency division multiplexing (OFDM) symbols used in the respective frequency hop, and transmitting, in each of the plurality of frequency hops, a plurality of consecutive OFDM symbols with at least one SRS in accordance with the sequence of resource element offsets indicated by the SRS configuration for the respective frequency hop.

Another aspect is directed to a method of wireless communication performed by a base station (BS), comprising transmitting, to a user equipment (UE), a sounding reference signal (SRS) configuration that indicates, for each of a plurality of frequency hops associated with the same comb-type, a sequence of resource element offsets that is based on a number of orthogonal frequency division multiplexing (OFDM) symbols used in the respective frequency hop, and receiving, from the UE in each of the plurality of frequency hops, a plurality of consecutive OFDM symbols with at least one SRS in accordance with the sequence of resource element offsets indicated by the SRS configuration for the respective frequency hop.

Another aspect is directed to a user equipment (UE), comprising means for receiving, from a network entity, a sounding reference signal (SRS) configuration that indicates, for at least one frequency hop, an allocation of less than all subcarriers of a sounding bandwidth to SRS per orthogonal frequency division multiplexing (OFDM) symbol in a respective frequency hop, and means for transmitting, in a first frequency hop in accordance with the SRS configuration, a first plurality of OFDM symbols with at least one SRS across all subcarriers of a first sounding bandwidth associated with the first frequency hop.

Another aspect is directed to a base station (BS), comprising means for transmitting, to a user equipment (UE), a sounding reference signal (SRS) configuration that indicates, for at least one frequency hop, an allocation of less than all subcarriers of a sounding bandwidth to SRS per orthogonal frequency division multiplexing (OFDM) symbol in a respective frequency hop, and means for receiving, from the UE in a first frequency hop, a first plurality of OFDM symbols with at least one SRS across all subcarriers of a first sounding bandwidth associated with the first frequency hop.

Another aspect is directed to a user equipment (UE), comprising means for receiving, from a network entity, a sounding reference signal (SRS) configuration that indicates, for each of a plurality of frequency hops associated with the same comb-type, a sequence of resource element offsets that is based on a number of orthogonal frequency division multiplexing (OFDM) symbols used in the respective frequency hop, and means for transmitting, in each of the plurality of frequency hops, a plurality of consecutive OFDM symbols with at least one SRS in accordance with the sequence of resource element offsets indicated by the SRS configuration for the respective frequency hop.

Another aspect is directed to a base station (BS), comprising means for transmitting, to a user equipment (UE), a sounding reference signal (SRS) configuration that indicates, for each of a plurality of frequency hops associated with the same comb-type, a sequence of resource element offsets that is based on a number of orthogonal frequency division multiplexing (OFDM) symbols used in the respective frequency hop, and means for receiving, from the UE in each of the plurality of frequency hops, a plurality of consecutive OFDM symbols with at least one SRS in accordance with the sequence of resource element offsets indicated by the SRS configuration for the respective frequency hop.

Another aspect is directed to a user equipment (UE), comprising a memory, at least one transceiver, and at least one processor communicatively coupled to the memory and the at least one transceiver, the at least one processor configured to receive, from a network entity, a sounding reference signal (SRS) configuration that indicates, for at least one frequency hop, an allocation of less than all subcarriers of a sounding bandwidth to SRS per orthogonal frequency division multiplexing (OFDM) symbol in a respective frequency hop, and transmit, in a first frequency hop in accordance with the SRS configuration, a first plurality of OFDM symbols with at least one SRS across all subcarriers of a first sounding bandwidth associated with the first frequency hop.

Another aspect is directed to a base station (BS), comprising a memory, at least one transceiver, and at least one processor communicatively coupled to the memory and the at least one transceiver, the at least one processor configured to transmit, to a user equipment (UE), a sounding reference signal (SRS) configuration that indicates, for at least one frequency hop, an allocation of less than all subcarriers of a sounding bandwidth to SRS per orthogonal frequency division multiplexing (OFDM) symbol in a respective frequency hop, and receive, from the UE in a first frequency hop, a first plurality of OFDM symbols with at least one SRS across all subcarriers of a first sounding bandwidth associated with the first frequency hop.

Another aspect is directed to a user equipment (UE), comprising a memory, at least one transceiver, and at least one processor communicatively coupled to the memory and the at least one transceiver, the at least one processor configured to receive, from a network entity, a sounding reference signal (SRS) configuration that indicates, for each of a plurality of frequency hops associated with the same comb-type, a sequence of resource element offsets that is based on a number of orthogonal frequency division multiplexing (OFDM) symbols used in the respective frequency hop, and transmit, in each of the plurality of frequency hops, a plurality of consecutive OFDM symbols with at least one SRS in accordance with the sequence of resource element offsets indicated by the SRS configuration for the respective frequency hop.

Another aspect is directed to a base station (BS), comprising a memory, at least one transceiver, and at least one processor communicatively coupled to the memory and the at least one transceiver, the at least one processor configured to transmit, to a user equipment (UE), a sounding reference signal (SRS) configuration that indicates, for each of a plurality of frequency hops associated with the same comb-type, a sequence of resource element offsets that is based on a number of orthogonal frequency division multiplexing (OFDM) symbols used in the respective frequency hop, and receive, from the UE in each of the plurality of frequency hops, a plurality of consecutive OFDM symbols with at least one SRS in accordance with the sequence of resource element offsets indicated by the SRS configuration for the respective frequency hop.

Another aspect is directed to a non-transitory computer-readable medium containing instructions stored thereon, for causing at least one processor in a user equipment (UE) to receive, from a network entity, a sounding reference signal (SRS) configuration that indicates, for at least one frequency hop, an allocation of less than all subcarriers of a sounding bandwidth to SRS per orthogonal frequency division multiplexing (OFDM) symbol in a respective frequency hop, and transmit, in a first frequency hop in accordance with the SRS configuration, a first plurality of OFDM symbols with at least one SRS across all subcarriers of a first sounding bandwidth associated with the first frequency hop.

Another aspect is directed to a non-transitory computer-readable medium containing instructions stored thereon, for causing at least one processor in a base station to transmit, to a user equipment (UE), a sounding reference signal (SRS) configuration that indicates, for at least one frequency hop, an allocation of less than all subcarriers of a sounding bandwidth to SRS per orthogonal frequency division multiplexing (OFDM) symbol in a respective frequency hop, and receive, from the UE in a first frequency hop, a first plurality of OFDM symbols with at least one SRS across all subcarriers of a first sounding bandwidth associated with the first frequency hop.

Another aspect is directed to a non-transitory computer-readable medium containing instructions stored thereon, for causing at least one processor in a user equipment (UE) to receive, from a network entity, a sounding reference signal (SRS) configuration that indicates, for each of a plurality of frequency hops associated with the same comb-type, a sequence of resource element offsets that is based on a number of orthogonal frequency division multiplexing (OFDM) symbols used in the respective frequency hop, and transmit, in each of the plurality of frequency hops, a plurality of consecutive OFDM symbols with at least one SRS in accordance with the sequence of resource element offsets indicated by the SRS configuration for the respective frequency hop.

Another aspect is directed to a non-transitory computer-readable medium containing instructions stored thereon, for causing at least one processor in a base station to transmit, to a user equipment (UE), a sounding reference signal (SRS) configuration that indicates, for each of a plurality of frequency hops associated with the same comb-type, a sequence of resource element offsets that is based on a number of orthogonal frequency division multiplexing (OFDM) symbols used in the respective frequency hop, and receive, from the UE in each of the plurality of frequency hops, a plurality of consecutive OFDM symbols with at least one SRS in accordance with the sequence of resource element offsets indicated by the SRS configuration for the respective frequency hop.

Other aspects are directed to means, apparatuses and/or computer-readable media comprising instructions for performing the above-noted methods.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

FIG. 20 illustrates an exemplary method of wireless communication, according to aspects of the disclosure.

FIG. 21 illustrates an exemplary method of wireless communication, according to aspects of the disclosure.

FIG. 22 illustrates an exemplary method of wireless communication, according to aspects of the disclosure.

DETAILED DESCRIPTION

Figure 1:
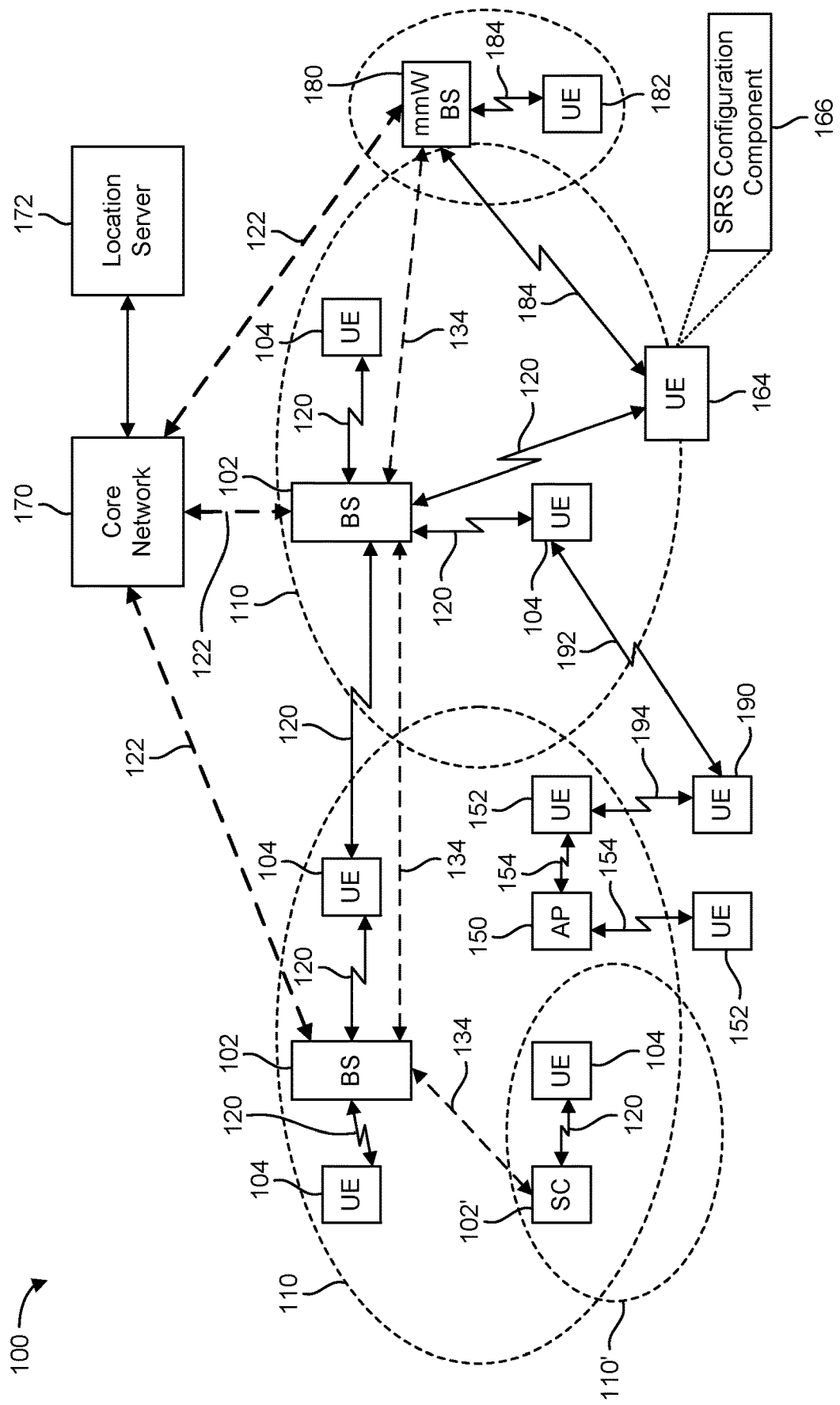
FIG. 1 illustrates an exemplary wireless communications system, according to various aspects.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular Radio Access Technology (RAT), unless otherwise noted. In general, a UE may be any wireless communication device (e.g., a mobile phone, router, tablet computer, laptop computer, tracking device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a Radio Access Network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11, etc.) and so on.

A base station may operate according to one of several RATs in communication with UEs depending on the network in which it is deployed, and may be alternatively referred to as an access point (AP), a network node, a NodeB, an evolved NodeB (eNB), a New Radio (NR) Node B (also referred to as a gNB or gNodeB), etc. In addition, in some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an UL/reverse or DL/forward traffic channel.

The term "base station" may refer to a single physical transmission point or to multiple physical transmission points that may or may not be co-located. For example, where the term "base station" refers to a single physical transmission point, the physical transmission point may be an antenna of the base station corresponding to a cell of the base station. Where the term "base station" refers to multiple co-located physical transmission points, the physical transmission points may be an array of antennas (e.g., as in a multiple-input multiple-output (MIMO) system or where the base station employs beamforming) of the base station. Where the term "base station" refers to multiple non-co-located physical transmission points, the physical transmission points may be a distributed antenna system (DAS) (a network of spatially separated antennas connected to a common source via a transport medium) or a remote radio head (RRH) (a remote base station connected to a serving base station). Alternatively, the non-co-located physical transmission points may be the serving base station receiving the measurement report from the UE and a neighbor base station whose reference RF signals the UE is measuring.

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal.

According to various aspects, FIG. 1 illustrates an exemplary wireless communications system 100. The wireless communications system 100 (which may also be referred to as a wireless wide area network (WWAN)) may include various base stations 102 and various UEs 104. The base stations 102 may include macro cell base stations (high power cellular base stations) and/or small cell base stations (low power cellular base stations). In an aspect, the macro cell base station may include eNBs where the wireless communications system 100 corresponds to an LTE network, or gNBs where the wireless communications system 100 corresponds to a 5G network, or a combination of both, and the small cell base stations may include femtocells, picocells, microcells, etc.

The base stations 102 may collectively form a RAN and interface with a core network 170 (e.g., an evolved packet core (EPC) or next generation core (NGC)) through backhaul links 122, and through the core network 170 to one or more location servers 172. In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/NGC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCID), a virtual cell identifier (VCID)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' may have a coverage area 110' that substantially overlaps with the coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include UL (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to DL and UL (e.g., more or less carriers may be allocated for DL than for UL).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) prior to communicating in order to determine whether the channel is available.

The small cell base station 102' may operate in a licensed and/or an unlicensed frequency spectrum. When operating in an unlicensed frequency spectrum, the small cell base station 102' may employ LTE or 5G technology and use the same 5 GHz unlicensed frequency spectrum as used by the WLAN AP 150. The small cell base station 102', employing LTE/5G in an unlicensed frequency spectrum, may boost coverage to and/or increase capacity of the access network. LTE in an unlicensed spectrum may be referred to as LTE-unlicensed (LTE-U), licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-collocated, meaning that they appear to the receiver (e.g., a UE) as having the same parameters, regardless of whether or not the transmitting antennas of the network node themselves are physically collocated. In NR, there are four types of quasi-collocation (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Receive beams may be spatially related. A spatial relation means that parameters for a transmit beam for a second reference signal can be derived from information about a receive beam for a first reference signal. For example, a UE may use a particular receive beam to receive a reference downlink reference signal (e.g., synchronization signal block (SSB)) from a base station. The UE can then form a transmit beam for sending an uplink reference signal (e.g., sounding reference signal (SRS)) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

In 5G, the frequency spectrum in which wireless nodes (e.g., base stations 102/180, UEs 104/182) operate is divided into multiple frequency ranges, FR1 (from 450 to 6000 MHz), FR2 (from 24250 to 52600 MHz), FR3 (above 52600 MHz), and FR4 (between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels. A secondary carrier is a carrier operating on a second frequency (e.g., FR2) that may be configured once the RRC connection is established between the UE 104 and the anchor carrier and that may be used to provide additional radio resources. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include one or more UEs, such as UE 190, that connects indirectly to one or more communication networks via one or more device-to-device (D2D) peer-to-peer (P2P) links. In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more SCells for the UE 164 and the mmW base station 180 may support one or more SCells for the UE 164. In an aspect, the UE 164 may include an SRS configuration component 166 that may enable the UE 164 to perform the UE operations described herein. Note that although only one UE in FIG. 1 is illustrated as having fully staggered SRS component 166, any of the UEs in FIG. 1 may be configured to perform the UE operations described herein.

Figure 2A:
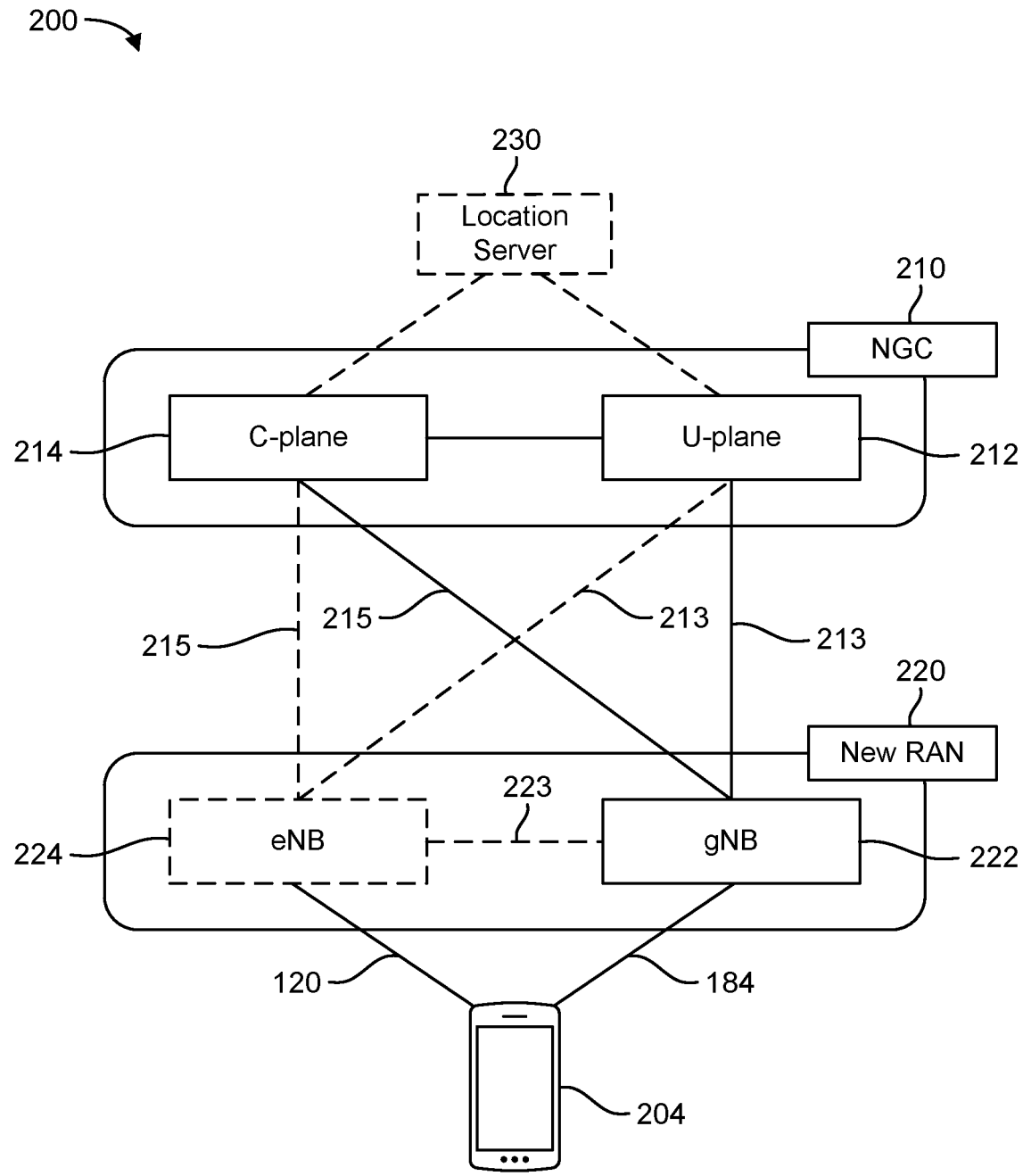
FIGS. 2A and 2B illustrate example wireless network structures, according to various aspects.

According to various aspects, FIG. 2A illustrates an example wireless network structure 200. For example, an NGC 210 (also referred to as a "5GC") can be viewed functionally as control plane functions 214 (e.g., UE registration, authentication, network access, gateway selection, etc.) and user plane functions 212, (e.g., UE gateway function, access to data networks, IP routing, etc.) which operate cooperatively to form the core network. User plane interface (NG-U) 213 and control plane interface (NG-C) 215 connect the gNB 222 to the NGC 210 and specifically to the control plane functions 214 and user plane functions 212. In an additional configuration, an eNB 224 may also be connected to the NGC 210 via NG-C 215 to the control plane functions 214 and NG-U 213 to user plane functions 212. Further, eNB 224 may directly communicate with gNB 222 via a backhaul connection 223. In some configurations, the New RAN 220 may only have one or more gNBs 222, while other configurations include one or more of both eNBs 224 and gNBs 222. Either gNB 222 or eNB 224 may communicate with UEs 204 (e.g., any of the UEs depicted in FIG. 1). Another optional aspect may include location server 230, which may be in communication with the NGC 210 to provide location assistance for UEs 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, NGC 210, and/or via the Internet (not illustrated). Further, the location server 230 may be integrated into a component of the core network, or alternatively may be external to the core network.

Figure 2B:
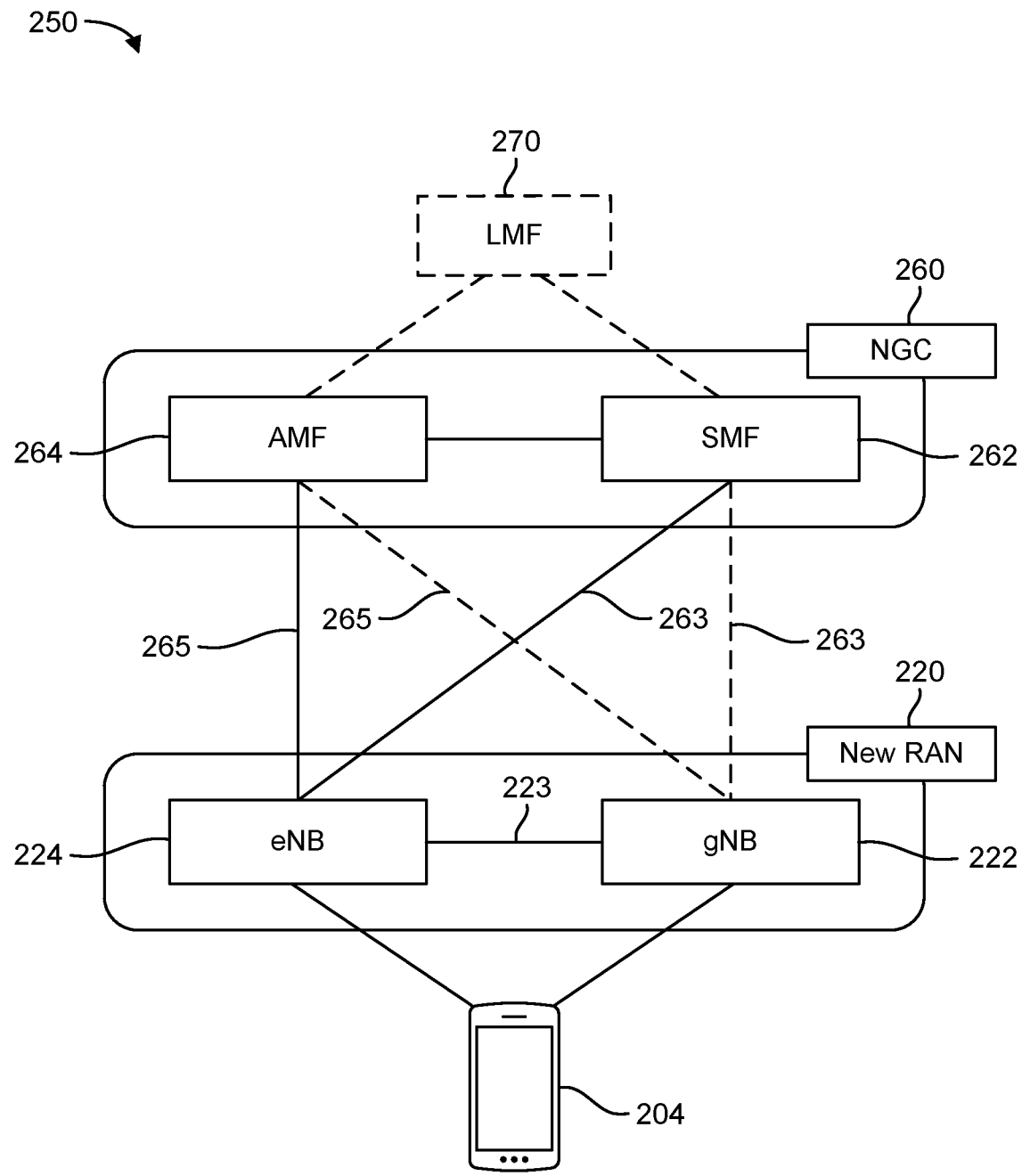

According to various aspects, FIG. 2B illustrates another example wireless network structure 250. For example, an NGC 260 (also referred to as a "5GC") can be viewed functionally as control plane functions, provided by an access and mobility management function (AMF)/user plane function (UPF) 264, and user plane functions, provided by a session management function (SMF) 262, which operate cooperatively to form the core network (i.e., NGC 260). User plane interface 263 and control plane interface 265 connect the eNB 224 to the NGC 260 and specifically to SMF 262 and AMF/UPF 264, respectively. In an additional configuration, a gNB 222 may also be connected to the NGC 260 via control plane interface 265 to AMF/UPF 264 and user plane interface 263 to SMF 262. Further, eNB 224 may directly communicate with gNB 222 via the backhaul connection 223, with or without gNB direct connectivity to the NGC 260. In some configurations, the New RAN 220 may only have one or more gNBs 222, while other configurations include one or more of both eNBs 224 and gNBs 222. Either gNB 222 or eNB 224 may communicate with UEs 204 (e.g., any of the UEs depicted in FIG. 1). The base stations of the New RAN 220 communicate with the AMF-side of the AMF/UPF 264 over the N2 interface and the UPF-side of the AMF/UPF 264 over the N3 interface.

The functions of the AMF include registration management, connection management, reachability management, mobility management, lawful interception, transport for session management (SM) messages between the UE 204 and the SMF 262, transparent proxy services for routing SM messages, access authentication and access authorization, transport for short message service (SMS) messages between the UE 204 and the short message service function (SMSF) (not shown), and security anchor functionality (SEAF). The AMF also interacts with the authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF retrieves the security material from the AUSF. The functions of the AMF also include security context management (SCM). The SCM receives a key from the SEAF that it uses to derive access-network specific keys. The functionality of the AMF also includes location services management for regulatory services, transport for location services messages between the UE 204 and the location management function (LMF) 270, as well as between the New RAN 220 and the LMF 270, evolved packet system (EPS) bearer identifier allocation for interworking with the EPS, and UE 204 mobility event notification. In addition, the AMF also supports functionalities for non-3GPP access networks.

Functions of the UPF include acting as an anchor point for intra-/inter-RAT mobility (when applicable), acting as an external protocol data unit (PDU) session point of interconnect to the data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., UL/DL rate enforcement, reflective QoS marking in the DL), UL traffic verification (service data flow (SDF) to QoS flow mapping), transport level packet marking in the UL and DL, DL packet buffering and DL data notification triggering, and sending and forwarding of one or more "end markers" to the source RAN node.

The functions of the SMF 262 include session management, UE Internet protocol (IP) address allocation and management, selection and control of user plane functions, configuration of traffic steering at the UPF to route traffic to the proper destination, control of part of policy enforcement and QoS, and downlink data notification. The interface over which the SMF 262 communicates with the AMF-side of the AMF/UPF 264 is referred to as the N11 interface.

Another optional aspect may include a LMF 270, which may be in communication with the NGC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, NGC 260, and/or via the Internet (not illustrated).

Figure 3:
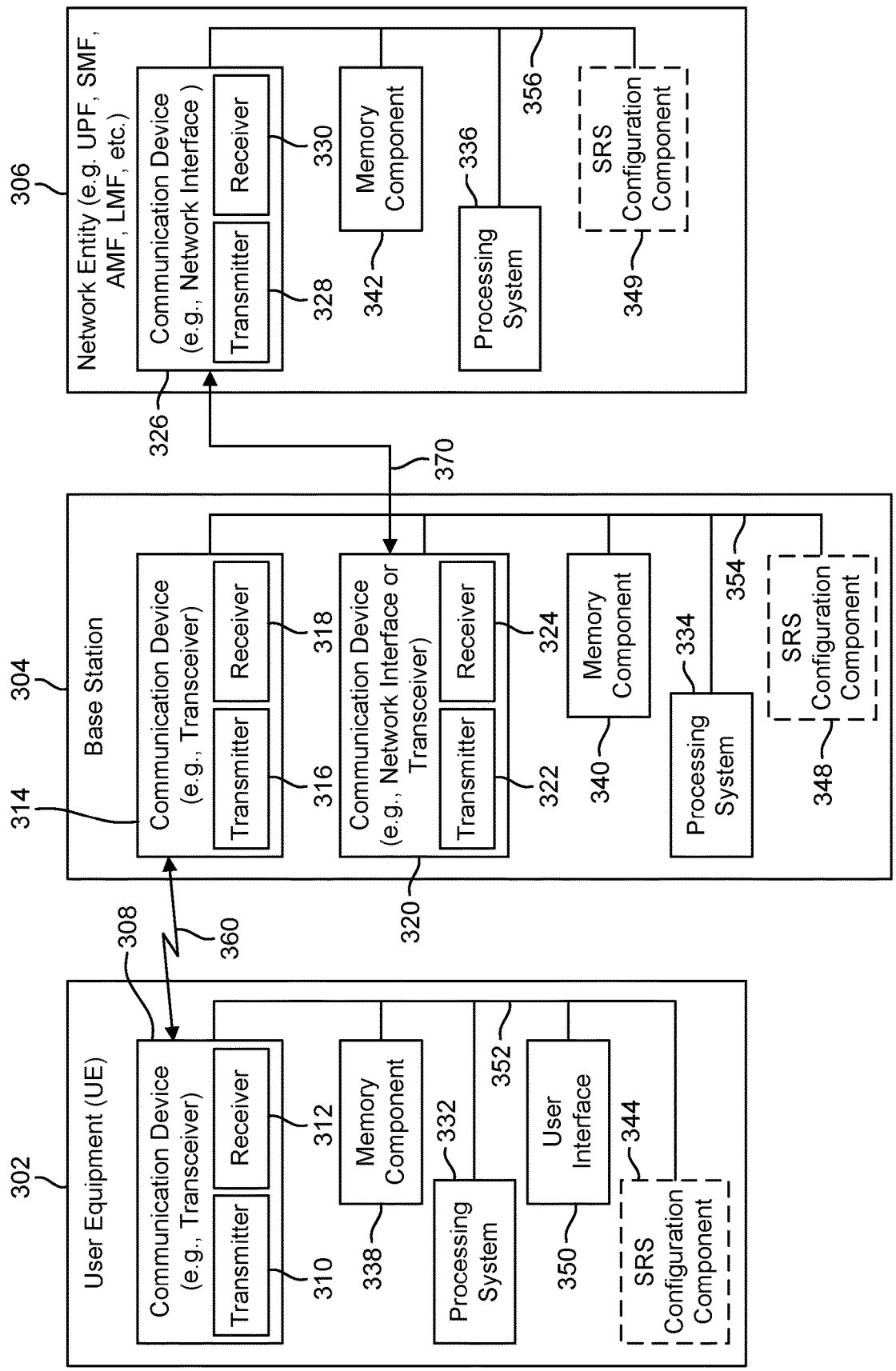
FIG. 3 is a block diagram illustrating an exemplary UE, BS and network entity, according to various aspects.

FIG. 3 illustrates several sample components (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein, including the location server 230 and the LMF 270) to support the file transmission operations as taught herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 each include at least one wireless communication device (represented by the communication devices 308 and 314 (and the communication device 320 if the apparatus 304 is a relay)) for communicating with other nodes via at least one designated RAT. For example, the communication devices 308 and 314 may communicate with each other over a wireless communication link 360, which may correspond to a communication link 120 in FIG. 1. Each communication device 308 includes at least one transmitter (represented by the transmitter 310) for transmitting and encoding signals (e.g., messages, indications, information, and so on) and at least one receiver (represented by the receiver 312) for receiving and decoding signals (e.g., messages, indications, information, pilots, and so on). Similarly, each communication device 314 includes at least one transmitter (represented by the transmitter 316) for transmitting signals (e.g., messages, indications, information, pilots, and so on) and at least one receiver (represented by the receiver 318) for receiving signals (e.g., messages, indications, information, and so on). If the base station 304 is a relay station, each communication device 320 may include at least one transmitter (represented by the transmitter 322) for transmitting signals (e.g., messages, indications, information, pilots, and so on) and at least one receiver (represented by the receiver 324) for receiving signals (e.g., messages, indications, information, and so on).

A transmitter and a receiver may comprise an integrated device (e.g., embodied as a transmitter circuit and a receiver circuit of a single communication device, generally referred to as a "transceiver") in some implementations, may comprise a separate transmitter device and a separate receiver device in some implementations, or may be embodied in other ways in other implementations. A wireless communication device (e.g., one of multiple wireless communication devices) of the base station 304 may also comprise a network listen module (NLM) or the like for performing various measurements.

The network entity 306 (and the base station 304 if it is not a relay station) includes at least one communication device (represented by the communication device 326 and, optionally, 320) for communicating with other nodes. For example, the communication device 326 may comprise a network interface that is configured to communicate with one or more network entities via a wire-based or wireless backhaul 370 (which may correspond to the backhaul link 122 in FIG. 1). In some aspects, the communication device 326 may be implemented as a transceiver configured to support wire-based or wireless signal communication, and the transmitter 328 and receiver 330 may be an integrated unit. This communication may involve, for example, sending and receiving: messages, parameters, or other types of information. Accordingly, in the example of FIG. 3, the communication device 326 is shown as comprising a transmitter 328 and a receiver 330. Alternatively, the transmitter 328 and receiver 330 may be separate devices within the communication device 326. Similarly, if the base station 304 is not a relay station, the communication device 320 may comprise a network interface that is configured to communicate with one or more network entities 306 via a wire-based or wireless backhaul 370. As with the communication device 326, the communication device 320 is shown as comprising a transmitter 322 and a receiver 324.

The apparatuses 302, 304, and 306 also include other components that may be used in conjunction with the file transmission operations as disclosed herein. The UE 302 includes a processing system 332 for providing functionality relating to, for example, the UE operations as described herein and for providing other processing functionality. The base station 304 includes a processing system 334 for providing functionality relating to, for example, the base station operations described herein and for providing other processing functionality. The network entity 306 includes a processing system 336 for providing functionality relating to, for example, the network function operations described herein and for providing other processing functionality. The apparatuses 302, 304, and 306 include memory components 338, 340, and 342 (e.g., each including a memory device), respectively, for maintaining information (e.g., information indicative of reserved resources, thresholds, parameters, and so on). In addition, the UE 302 includes a user interface 350 for providing indications (e.g., audible and/or visual indications) to a user and/or for receiving user input (e.g., upon user actuation of a sensing device such a keypad, a touch screen, a microphone, and so on). Although not shown, the apparatuses 304 and 306 may also include user interfaces.

Referring to the processing system 334 in more detail, in the downlink, IP packets from the network entity 306 may be provided to the processing system 334. The processing system 334 may implement functionality for a radio resource control (RRC) layer, a packet data convergence protocol (PDCP) layer, a radio link control (RLC) layer, and a medium access control (MAC) layer. The processing system 334 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 316 and the receiver 318 may implement Layer-1 functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas. The transmitter 316 may modulate an RF carrier with a respective spatial stream for transmission.

At the UE 302, the receiver 312 receives a signal through its respective antenna(s). The receiver 312 recovers information modulated onto an RF carrier and provides the information to the processing system 332. The transmitter 310 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator. The soft decisions are then decoded and de-interleaved to recover the data and control signals that were originally transmitted by the base station 304 on the physical channel. The data and control signals are then provided to the processing system 332, which implements Layer-3 and Layer-2 functionality.

In the UL, the processing system 332 provides demultiplexing between transport and logical channels, packet reassembly, deciphering, header decompression, and control signal processing to recover IP packets from the core network. The processing system 332 is also responsible for error detection.

Similar to the functionality described in connection with the DL transmission by the base station 304, the processing system 332 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

Channel estimates derived by the channel estimator from a reference signal or feedback transmitted by the base station 304 may be used by the transmitter 310 to select the appropriate coding and modulation schemes, and to facilitate spatial processing. The spatial streams generated by the transmitter 310 may be provided to different antenna(s). The transmitter 310 may modulate an RF carrier with a respective spatial stream for transmission.

The UL transmission is processed at the base station 304 in a manner similar to that described in connection with the receiver function at the UE 302. The receiver 318 receives a signal through its respective antenna(s). The receiver 318 recovers information modulated onto an RF carrier and provides the information to the processing system 334.

In the UL, the processing system 334 provides demultiplexing between transport and logical channels, packet reassembly, deciphering, header decompression, control signal processing to recover IP packets from the UE 302. IP packets from the processing system 334 may be provided to the core network. The processing system 334 is also responsible for error detection.

In an aspect, the apparatuses 302, 304 and 306 may include SRS configuration components 344, 348 and 349, respectively. It will be appreciated the functionality of the various SRS configuration components 344, 348 and 349 may differ based on the device it is being implemented. For example, at the network entity 306, the SRS configuration component 349 may provide SRS configurations discussed herein, to the UE 302, which is received and acted upon by SRS configuration component 344. The SRS configuration components 344, 348 and 349 may be hardware circuits that are part of or coupled to the processing systems 332, 334, and 336, respectively, that, when executed, cause the apparatuses 302, 304, and 306 to perform the functionality described herein. Alternatively, the SRS configuration components 344, 348 and 349 may be memory modules stored in the memory components 338, 340, and 342, respectively, that, when executed by the processing systems 332, 334, and 336, cause the apparatuses 302, 304, and 306 to perform the functionality described herein.

For convenience, the apparatuses 302, 304, and/or 306 are shown in FIG. 3 as including various components that may be configured according to the various examples described herein. It will be appreciated, however, that the illustrated blocks may have different functionality in different designs.

The various components of the apparatuses 302, 304, and 306 may communicate with each other over data buses 352, 354, and 356, respectively. The components of FIG. 3 may be implemented in various ways. In some implementations, the components of FIG. 3 may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 308, 332, 338, 344, and 350 may be implemented by processor and memory component(s) of the UE 302 (e.g., by execution of appropriate code and/or by appropriate configuration of processor components). Similarly, some or all of the functionality represented by blocks 314, 320, 334, 340, and 348 may be implemented by processor and memory component(s) of the base station 304 (e.g., by execution of appropriate code and/or by appropriate configuration of processor components). Also, some or all of the functionality represented by blocks 326, 336, 342, and 349 may be implemented by processor and memory component(s) of the network entity 306 (e.g., by execution of appropriate code and/or by appropriate configuration of processor components). For simplicity, various operations, acts, and/or functions are described herein as being performed "by a UE," "by a base station," "by a positioning entity," etc. However, as will be appreciated, such operations, acts, and/or functions may actually be performed by specific components or combinations of components of the UE, base station, positioning entity, etc., such as the processing systems 332, 334, 336, the communication devices 308, 314, 326, SRS configuration components 344, 348 and 349, etc.

Figure 4:
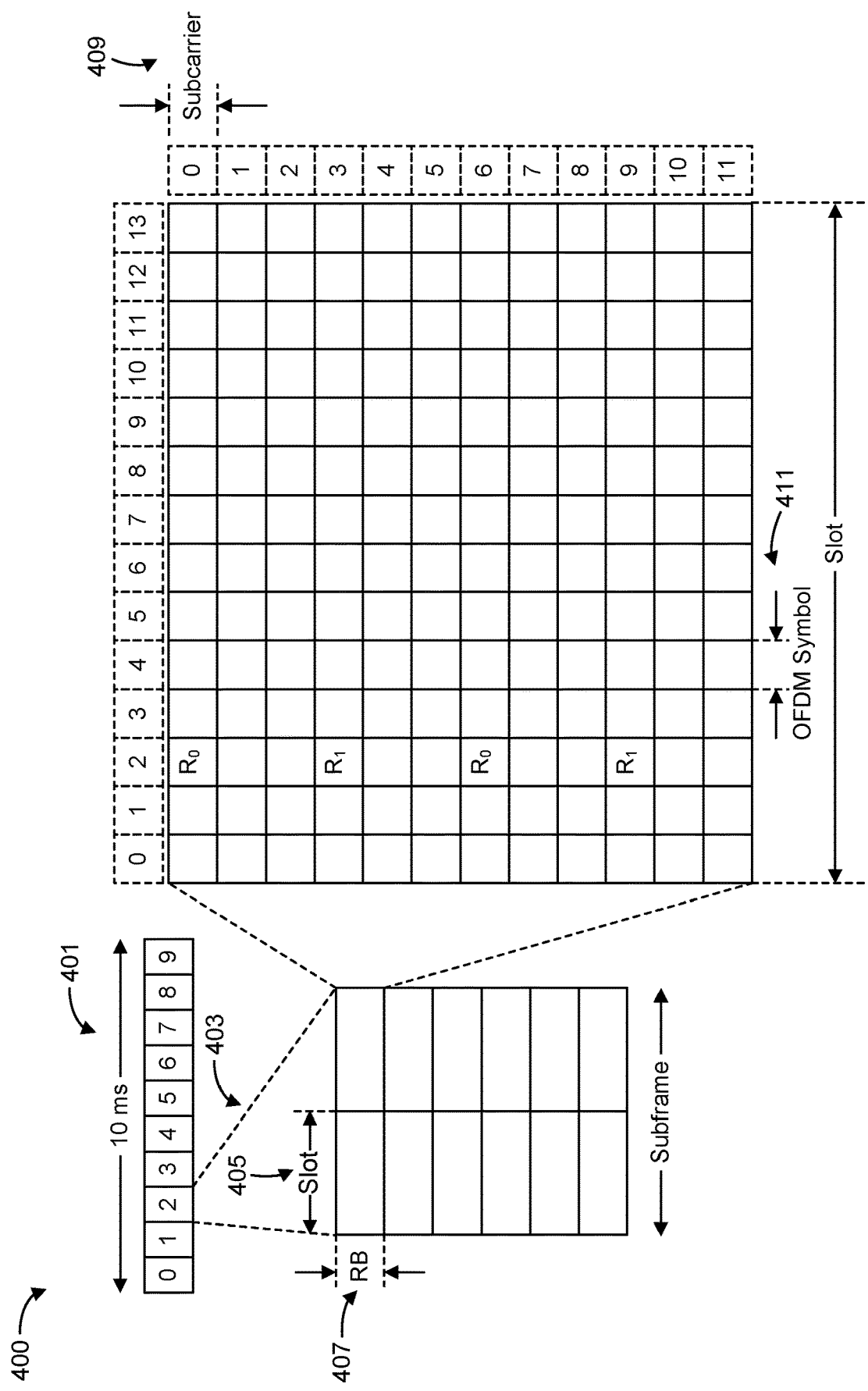
FIG. 4 is a diagram illustrating an example of a frame structure for use in a wireless telecommunications system according to an aspect of the disclosure.

Various frame structures may be used to support downlink and uplink transmissions between network nodes (e.g., base stations and UEs). FIG. 4 illustrates an example of a downlink frame structure 400 according to aspects of the disclosure. However, as those skilled in the art will readily appreciate, the frame structure for any particular application may be different depending on any number of factors. In FIG. 4, time is represented horizontally (e.g., on the X axis) with time increasing from left to right, while frequency is represented vertically (e.g., on the Y axis) with frequency increasing (or decreasing) from bottom to top. In the time domain, a frame 410 (10 ms) is divided into 10 equally sized subframes 420 (1 ms). Each subframe 420 includes two consecutive time slots 430 (0.5 ms).

A resource grid may be used to represent two time slots 430, each time slot 430 including one or more resource blocks (RBs) 440 in the frequency domain (also referred to as "physical resource blocks" or "PRBs"). In LTE, and in some cases NR, a resource block 440 contains 12 consecutive subcarriers 450 in the frequency domain and, for a normal cyclic prefix (CP) in each OFDM symbol 460, 7 consecutive OFDM symbols 460 in the time domain. A resource of one OFDM symbol length in the time domain and one subcarrier in the frequency domain (represented as a block of the resource grid) is referred to as a resource element (RE). As such, in the example of FIG. 4, there are 84 resource elements in a resource block 440.

LTE, and in some cases NR, utilize OFDM on the downlink and single-carrier frequency division multiplexing (SC-FDM) on the uplink. Unlike LTE, however, NR has an option to use OFDM on the uplink as well. OFDM and SC-FDM partition the system bandwidth into multiple (K) orthogonal subcarriers 450, which are also commonly referred to as tones, bins, etc. Each subcarrier 450 may be modulated with data. In general, modulation symbols are sent in the frequency domain with OFDM and in the time domain with SC-FDM. The spacing between adjacent subcarriers 450 may be fixed, and the total number of subcarriers 450 (K) may be dependent on the system bandwidth. For example, the spacing of the subcarriers 450 may be 15 kHz and the minimum resource allocation (resource block) may be 12 subcarriers 450 (or 180 kHz). Consequently, the nominal FFT size may be equal to 128, 256, 512, 1024, or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10, or 20 MHz, respectively.

LTE supports a single numerology (subcarrier spacing, symbol length, etc.). In contrast NR may support multiple numerologies, for example, subcarrier spacing of 15 kHz, 30 kHz, 60 kHz, 120 kHz and 204 kHz or greater may be available. Table 1 provided below lists some various parameters for different NR numerologies.

TABLE 1

| Subcarrier spacing (kHz) | Symbols/ slot | slots/ subframe | slots/ frame | slot (ms) | Symbol duration (μs) | Max. nominal system BW (MHz) with 4K FFT size |
| --- | --- | --- | --- | --- | --- | --- |
| 15 | 14 | 1 | 10 | 1 | 66.7 | 50 |
| 30 | 14 | 2 | 20 | 0.5 | 33.3 | 100 |
| 60 | 14 | 4 | 40 | 0.25 | 16.7 | 100 |
| 120 | 14 | 8 | 80 | 0.125 | 8.33 | 400 |
| 204 | 14 | 16 | 160 | 0.0625 | 4.17 | 800 |

With continued reference to FIG. 4, some of the resource elements, indicated as $R_0$ and $R_1$, include a downlink reference signal (DL-RS). The DL-RS may include cell-specific RS (CRS) (also sometimes called common RS) and UE-specific RS (UE-RS). UE-RS are transmitted only on the resource blocks 440 upon which the corresponding physical downlink shared channel (PDSCH) is mapped. The number of bits carried by each resource element depends on the modulation scheme. Thus, the more resource blocks 440 that a UE receives and the higher the modulation scheme, the higher the data rate for the UE.

In an aspect, the DL-RS may be positioning reference signals (PRS). A base station may transmit radio frames (e.g., radio frames 410), or other physical layer signaling sequences, supporting PRS signals according to frame configurations either similar to, or the same as that, shown in FIG. 4, which may be measured and used for a UE (e.g., any of the UEs described herein) position estimation. Other types of wireless nodes (e.g., a distributed antenna system (DAS), remote radio head (RRH), UE, AP, etc.) in a wireless communications network may also be configured to transmit PRS signals configured in a manner similar to (or the same as) that depicted in FIG. 4.

A collection of resource elements that are used for transmission of PRS is referred to as a "PRS resource." The collection of resource elements can span multiple PRBs in the frequency domain and N (e.g., 1 or more) consecutive symbol(s) 460 within a slot 430 in the time domain. In a given OFDM symbol 460, a PRS resource occupies consecutive PRBs. A PRS resource is described by at least the following parameters: PRS resource identifier (ID), sequence ID, comb size-N, resource element offset in the frequency domain, starting slot and starting symbol, number of symbols per PRS resource (i.e., the duration of the PRS resource), and QCL information (e.g., QCL with other DL reference signals). Currently, one antenna port is supported. The comb size indicates the number of subcarriers in each symbol carrying PRS. For example, a comb-size of comb-4 means that every fourth subcarrier of a given symbol carries PRS.

A "PRS resource set" is a set of PRS resources used for the transmission of PRS signals, where each PRS resource has a PRS resource ID. In addition, the PRS resources in a PRS resource set are associated with the same transmission-reception point (TRP). A PRS resource ID in a PRS resource set is associated with a single beam transmitted from a single TRP (where a TRP may transmit one or more beams). That is, each PRS resource of a PRS resource set may be transmitted on a different beam, and as such, a "PRS resource" can also be referred to as a "beam." Note that this does not have any implications on whether the TRPs and the beams on which PRS are transmitted are known to the UE. A "PRS occasion" is one instance of a periodically repeated time window (e.g., a group of one or more consecutive slots) where PRS are expected to be transmitted. A PRS occasion may also be referred to as a "PRS positioning occasion," a "positioning occasion," or simply an "occasion."

Note that the terms "positioning reference signal" and "PRS" may sometimes refer to specific reference signals that are used for positioning in LTE systems. However, as used herein, unless otherwise indicated, the terms "positioning reference signal" and "PRS" refer to any type of reference signal that can be used for positioning, such as but not limited to, PRS signals in LTE, navigation reference signals (NRS) in 5G, transmitter reference signals (TRS), cell-specific reference signals (CRS), channel state information reference signals (CSI-RS), primary synchronization signals (PSS), secondary synchronization signals (SSS), SSB, etc.

In NR, there is no requirement for precise timing synchronization across the network. Instead, it is sufficient to have coarse time-synchronization across gNBs (e.g., within a cyclic prefix (CP) duration of the OFDM symbols). RTT-based methods generally only need coarse timing synchronization, and as such, are a preferred positioning method in NR.

In a network-centric RTT estimation, the serving base station (e.g., base station 102) instructs the UE (e.g., UE 104) to scan for/receive RTT measurement signals (e.g., PRS) on serving cells of two or more neighboring base stations (and typically the serving base station, as at least three base stations are needed). The one of more base stations transmit RTT measurement signals on low reuse resources (e.g., resources used by the base station to transmit system information) allocated by the network (e.g., location server 230, LMF 270). The UE records the arrival time (also referred to as a receive time, a reception time, a time of reception, or a time of arrival (ToA)) of each RTT measurement signal relative to the UE's current downlink timing (e.g., as derived by the UE from a DL signal received from its serving base station), and transmits a common or individual RTT response message (e.g., SRS, UL-PRS) to the one or more base stations (e.g., when instructed by its serving base station) and may include the difference $T_{Rx \to Tx}$ (e.g., $T_{Rx \to Tx}$ 612 in FIG. 6) between the ToA of the RTT measurement signal and the transmission time of the RTT response message in a payload of each RTT response message. The RTT response message would include a reference signal from which the base station can deduce the ToA of the RTT response. By comparing the difference $T_{Tx \to Rx}$ (e.g., $T_{Tx \to Rx}$ 622 in FIG. 6) between the transmission time of the RTT measurement signal and the ToA of the RTT response to the UE-reported difference $T_{Rx \to Tx}$ (e.g., $T_{Rx \to Tx}$ 612 in 6), the base station can deduce the propagation time between the base station and the UE, from which it can then determine the distance between the UE and the base station by assuming the speed of light during this propagation time.

A UE-centric RTT estimation is similar to the network-based method, except that the UE transmits uplink RTT measurement signal(s) (e.g., when instructed by a serving base station), which are received by multiple base stations in the neighborhood of the UE. Each involved base station responds with a downlink RTT response message, which may include the time difference between the ToA of the RTT measurement signal at the base station and the transmission time of the RTT response message from the base station in the RTT response message payload.

For both network-centric and UE-centric procedures, the side (network or UE) that performs the RTT calculation typically (though not always) transmits the first message(s) or signal(s) (e.g., RTT measurement signal(s)), while the other side responds with one or more RTT response message(s) or signal(s) that may include the difference between the ToA of the first message(s) or signal(s) and the transmission time of the RTT response message(s) or signal(s).

Figure 5:
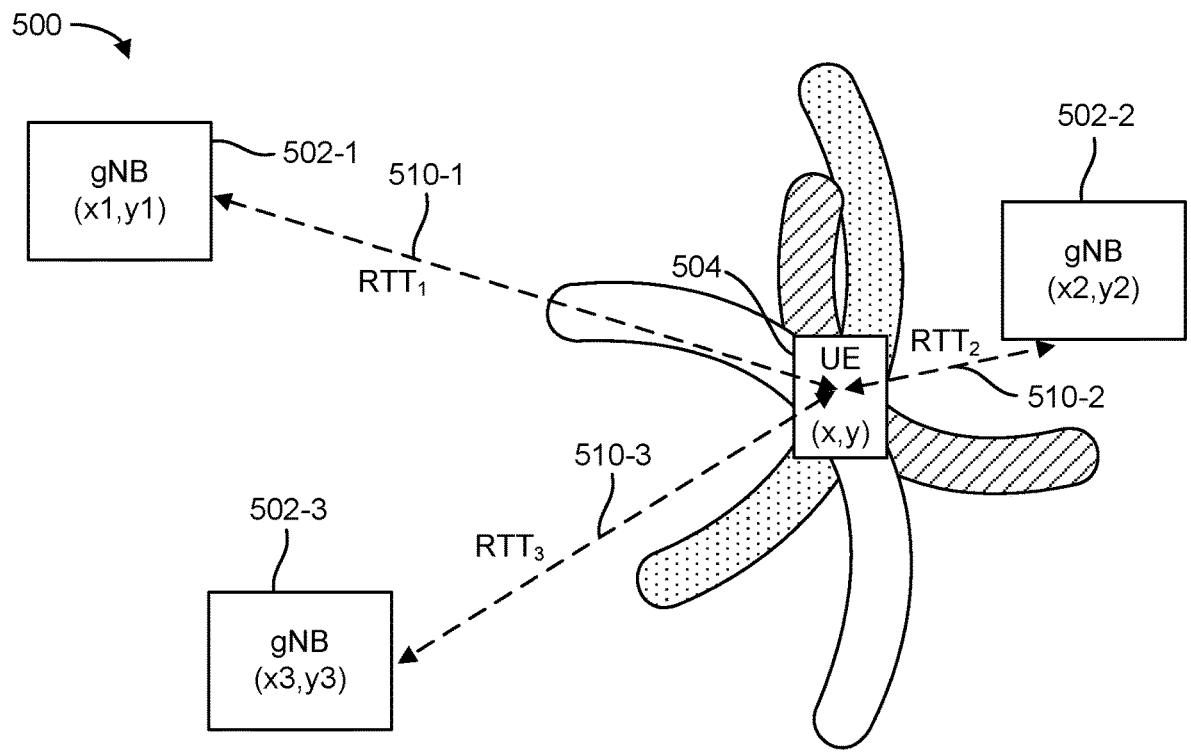
FIG. 5 is a diagram illustrating an exemplary technique for determining a position of a UE using information obtained from a plurality of base stations.

FIG. 5 illustrates an exemplary wireless communications system 500 according to aspects of the disclosure. In the example of FIG. 5, a UE 504 (which may correspond to any of the UEs described herein) is attempting to calculate an estimate of its position, or assist another entity (e.g., a base station or core network component, another UE, a location server, a third party application, etc.) to calculate an estimate of its position. The UE 504 may communicate wirelessly with a plurality of base stations 502-1, 502-2, and 502-3 (collectively, base stations 502, and which may correspond to any of the base stations described herein) using RF signals and standardized protocols for the modulation of the RF signals and the exchange of information packets. By extracting different types of information from the exchanged RF signals, and utilizing the layout of the wireless communications system 500 (i.e., the base stations' locations, geometry, etc.), the UE 504 may determine its position, or assist in the determination of its position, in a predefined reference coordinate system. In an aspect, the UE 504 may specify its position using a two-dimensional coordinate system; however, the aspects disclosed herein are not so limited, and may also be applicable to determining positions using a three-dimensional coordinate system, if the extra dimension is desired. Additionally, while FIG. 5 illustrates one UE 504 and three base stations 502, as will be appreciated, there may be more UEs 504 and more base stations 502.

To support position estimates, the base stations 502 may be configured to broadcast reference RF signals (e.g., PRS, NRS, CRS, TRS, CSI-RS, PSS, SSS, etc.) to UEs 504 in their coverage area to enable a UE 504 to measure characteristics of such reference RF signals. For example, the UE 504 may measure the ToA of specific reference RF signals (e.g., PRS, NRS, CRS, CSI-RS, etc.) transmitted by at least three different base stations 502 and may use the RTT positioning method to report these ToAs (and additional information) back to the serving base station 502 or another positioning entity (e.g., location server 230, LMF 270).

In an aspect, although described as the UE 504 measuring reference RF signals from a base station 502, the UE 504 may measure reference RF signals from one of multiple cells supported by a base station 502. Where the UE 504 measures reference RF signals transmitted by a cell supported by a base station 502, the at least two other reference RF signals measured by the UE 504 to perform the RTT procedure would be from cells supported by base stations 502 different from the first base station 502 and may have good or poor signal strength at the UE 504.

In order to determine the position (x, y) of the UE 504, the entity determining the position of the UE 504 needs to know the locations of the base stations 502, which may be represented in a reference coordinate system as $(x_k, y_k)$, where k=1, 2, 3 in the example of FIG. 5. Where one of the base stations 502 (e.g., the serving base station) or the UE 504 determines the position of the UE 504, the locations of the involved base stations 502 may be provided to the serving base station 502 or the UE 504 by a location server with knowledge of the network geometry (e.g., location server 230, LMF 270). Alternatively, the location server may determine the position of the UE 504 using the known network geometry.

Either the UE 504 or the respective base station 502 may determine the distance ($d_k$, where k=1, 2, 3) between the UE 504 and the respective base station 502. In an aspect, determining the RTT 510 of signals exchanged between the UE 504 and any base station 502 can be performed and converted to a distance ($d_k$). As discussed further below, RTT techniques can measure the time between sending a signaling message (e.g., reference RF signals) and receiving a response. These methods may utilize calibration to remove any processing delays. In some environments, it may be assumed that the processing delays for the UE 504 and the base stations 502 are the same. However, such an assumption may not be true in practice.

Once each distance $d_k$ is determined, the UE 504, a base station 502, or the location server (e.g., location server 230, LMF 270) can solve for the position (x, y) of the UE 504 by using a variety of known geometric techniques, such as, for example, trilateration. From FIG. 5, it can be seen that the position of the UE 504 ideally lies at the common intersection of three semicircles, each semicircle being defined by radius $d_k$ and center $(x_k, y_k)$, where k=1, 2, 3.

In some instances, additional information may be obtained in the form of an angle of arrival (AoA) or angle of departure (AoD) that defines a straight line direction (e.g., which may be in a horizontal plane or in three dimensions) or possibly a range of directions (e.g., for the UE 504 from the location of a base station 502). The intersection of the two directions at or near the point (x, y) can provide another estimate of the location for the UE 504.

A position estimate (e.g., for a UE 504) may be referred to by other names, such as a location estimate, location, position, position fix, fix, or the like. A position estimate may be geodetic and comprise coordinates (e.g., latitude, longitude, and possibly altitude) or may be civic and comprise a street address, postal address, or some other verbal description of a location. A position estimate may further be defined relative to some other known location or defined in absolute terms (e.g., using latitude, longitude, and possibly altitude). A position estimate may include an expected error or uncertainty (e.g., by including an area or volume within which the location is expected to be included with some specified or default level of confidence).

Figure 6:
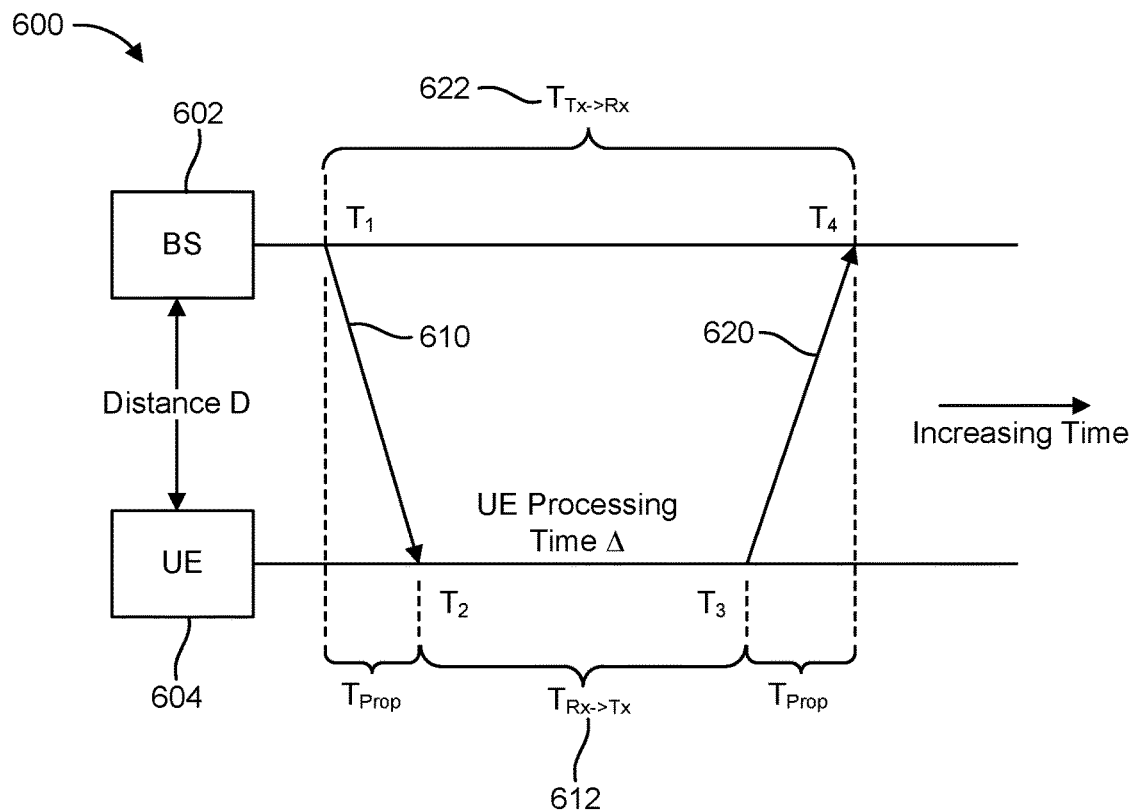
FIG. 6 is a diagram showing exemplary timings of round-trip-time (RTT) measurement signals exchanged between a base station and a UE, according to aspects of the disclosure.

FIG. 6 is a diagram 600 showing exemplary timings of RTT measurement signals exchanged between a base station 602 (e.g., any of the base stations described herein) and a UE 604 (e.g., any of the UEs described herein), according to aspects of the disclosure. In the example of FIG. 6, the base station 602 sends an RTT measurement signal 610 (e.g., PRS, NRS, CRS, CSI-RS, etc.) to the UE 604 at time $T_1$. The RTT measurement signal 610 has some propagation delay $T_{Prop}$ as it travels from the base station 602 to the UE 604. At time $T_2$ (the ToA of the RTT measurement signal 610 at the UE 604), the UE 604 receives/measures the RTT measurement signal 610. After some UE processing time, the UE 604 transmits an RTT response signal 620 at time $T_3$. After the propagation delay $T_{Prop}$, the base station 602 receives/ measures the RTT response signal 620 from the UE 604 at time $T_4$ (the ToA of the RTT response signal 620 at the base station 602).

In order to identify the ToA (e.g., $T_2$) of a reference signal (e.g., an RTT measurement signal 610) transmitted by a given network node (e.g., base station 602), the receiver (e.g., UE 604) first jointly processes all the resource elements (REs) on the channel on which the transmitter is transmitting the reference signal, and performs an inverse Fourier transform to convert the received reference signals to the time domain. The conversion of the received reference signals to the time domain is referred to as estimation of the channel energy response (CER). The CER shows the peaks on the channel over time, and the earliest "significant" peak should therefore correspond to the ToA of the reference signal. Generally, the receiver will use a noise-related quality threshold to filter out spurious local peaks, thereby presumably correctly identifying significant peaks on the channel. For example, the receiver may chose a ToA estimate that is the earliest local maximum of the CER that is at least X dB higher than the median of the CER and a maximum Y dB lower than the main peak on the channel. The receiver determines the CER for each reference signal from each transmitter in order to determine the ToA of each reference signal from the different transmitters.

The RTT response signal 620 may explicitly include the difference between time $T_3$ and time $T_2$ (i.e., $T_{Rx \to Tx}$ 612). Alternatively, it may be derived from the timing advance (TA), i.e., the relative UL/DL frame timing and specification location of UL reference signals. (Note that the TA is usually the RTT between the base station and the UE, or double the propagation time in one direction.) Using this measurement and the difference between time $T_4$ and time $T_1$ (i.e., $T_{Tx \to Rx}$ 622), the base station 602 (or other positioning entity, such as location server 230, LMF 270) can calculate the distance to the UE 604 as:

$$d = \frac{1}{2c}(T_{Tx \to Rx} - T_{Rx \to Tx}) = \frac{1}{2c}(T_2 - T_1) - \frac{1}{2c}(T_4 - T_3)$$

where c is the speed of light.

An SRS is an uplink-only signal that a UE transmits to help the base station obtain the channel state information (CSI) for each user. Channel state information describes how an RF signal propagates from the UE to the base station and represents the combined effect of scattering, fading, and power decay with distance. The system uses the SRS for resource scheduling, link adaptation, massive MIMO, beam management, etc.

Several enhancements over the previous definition of SRS have been proposed for SRS for positioning, such as a new staggered pattern within an SRS resource, a new comb type for SRS, new sequences for SRS, a higher number of SRS resource sets per component carrier, and a higher number of SRS resources per component carrier. In addition, the parameters "SpatialRelationInfo" and "PathLossReference" are to be configured based on a DL RS from a neighboring TRP. Further still, one SRS resource may be transmitted outside the active bandwidth part (BWP), and one SRS resource may span across multiple component carriers. Lastly, the UE may transmit through the same transmit beam from multiple SRS resources for UL-AoA. All of these are features that are additional to the current SRS framework, which is configured through RRC higher layer signaling (and potentially triggered or activated through MAC control element (CE) or downlink control information (DCI)).

As noted above, sounding reference signals (SRS) in NR are UE-specifically configured reference signals transmitted by the UE used for the purposes of the sounding the uplink radio channel. Similar to CSI-RS, such sounding provides various levels of knowledge of the radio channel characteristics. On one extreme, the SRS can be used at the gNB simply to obtain signal strength measurements, e.g., for the purposes of UL beam management. On the other extreme, SRS can be used at the gNB to obtain detailed amplitude and phase estimates as a function of frequency, time and space. In NR, channel sounding with SRS supports a more diverse set of use cases compared to LTE (e.g., downlink CSI acquisition for reciprocity-based gNB transmit beamforming (downlink MIMO); uplink CSI acquisition for link adaptation and codebook/non-codebook based precoding for uplink MIMO, uplink beam management, etc.).

The SRS can be configured using various options. The time/frequency mapping of an SRS resource is defined by the following characteristics.

Time duration $N_{symb}^{SRS}$—The time duration of an SRS resource can be 1, 2, or 4 consecutive OFDM symbols within a slot, in contrast to LTE which allows only a single OFDM symbol per slot.

Starting symbol location $l_0$—The starting symbol of an SRS resource can be located anywhere within the last 6 OFDM symbols of a slot provided the resource does not cross the end-of-slot boundary.

Repetition factor R—For an SRS resource configured with frequency hopping, repetition allows the same set of subcarriers to be sounded in R consecutive OFDM symbols before the next hop occurs (as used herein, a "hop" refers to specifically to a frequency hop). For example, values of R are 1, 2, 4 where $R \le N_{symb}^{SRS}$.

Transmission comb spacing $K_{TC}$ and comb offset $k_{TC}$—An SRS resource may occupy resource elements (REs) of a frequency domain comb structure, where the comb spacing is either 2 or 4 REs like in LTE. Such a structure allows frequency domain multiplexing of different SRS resources of the same or different users on different combs, where the different combs are offset from each other by an integer number of REs. The comb offset is defined with respect to a PRB boundary, and can take values in the range 0, 1, . . . , $K_{TC}-1$ REs. Thus, for comb spacing $K_{TC}=2$, there are 2 different combs available for multiplexing if needed, and for comb spacing $K_{TC}=4$, there are 4 different available combs.

Periodicity and slot offset for the case of periodic/semi-persistent SRS.

Sounding bandwidth within a bandwidth part.

Figure 7:
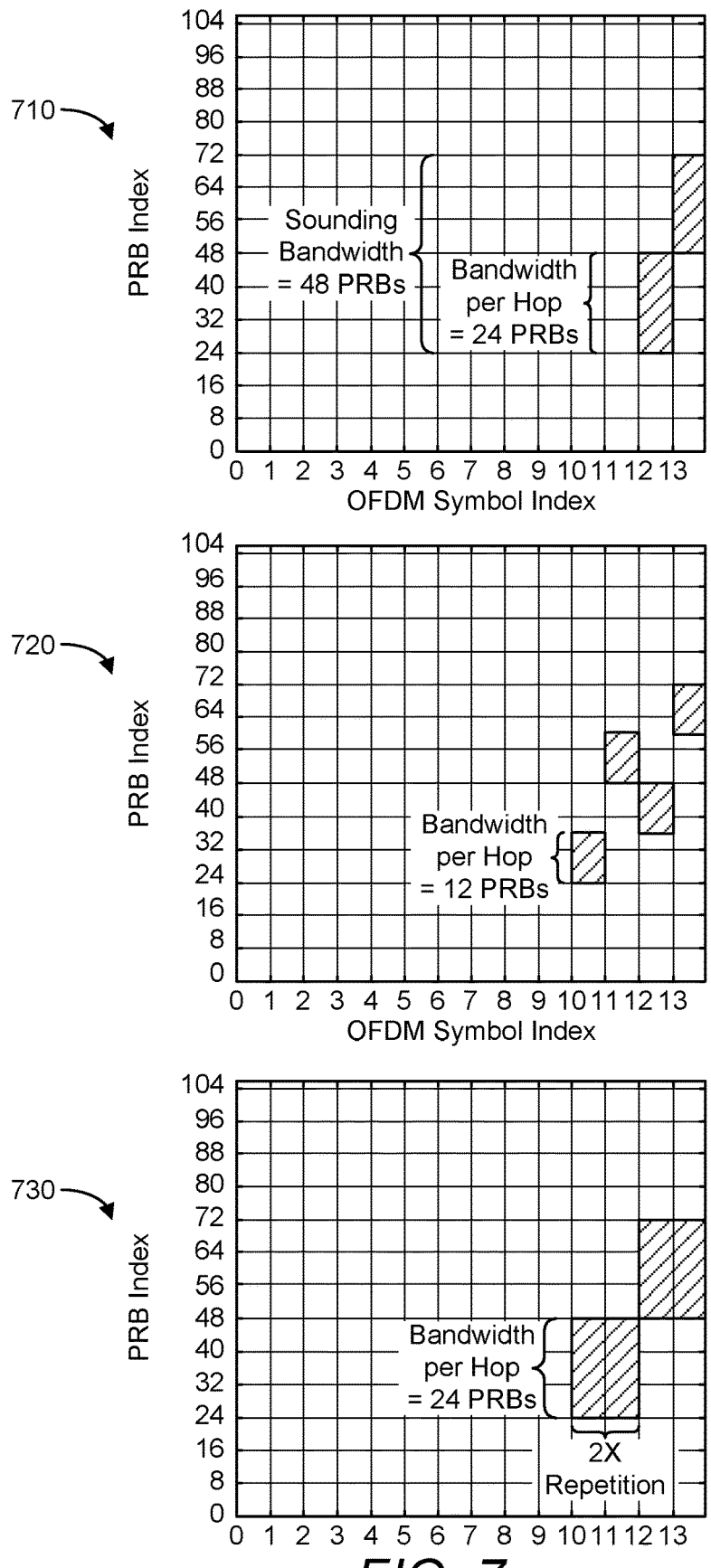
FIG. 7 illustrates some examples of different SRS configuration options.

FIG. 7 illustrates some examples of different SRS configuration options. A two symbol SRS resource with a repetition of 1 and 2 hops is illustrated in 710. As illustrated the sounding bandwidth is 48 PRBs with a bandwidth per hop of 24 PRBs with each being located in the last two symbols of a respective slot. A four symbol SRS resource with a repetition of 1 and 4 hops is illustrated in 720. As illustrated the sounding bandwidth is 48 PRBs with a bandwidth per hop of 12 PRBs with each being located in the last four symbols of a respective slot. A four symbol SRS resource with a repetition of 2 and 2 hops is illustrated in 730. As illustrated the sounding bandwidth is 48 PRBs with a bandwidth per hop of 24 PRBs with each being located in the last four symbols of a respective slot. In this SRS configuration, there is a two times repetition before the hop.

Figure 8:
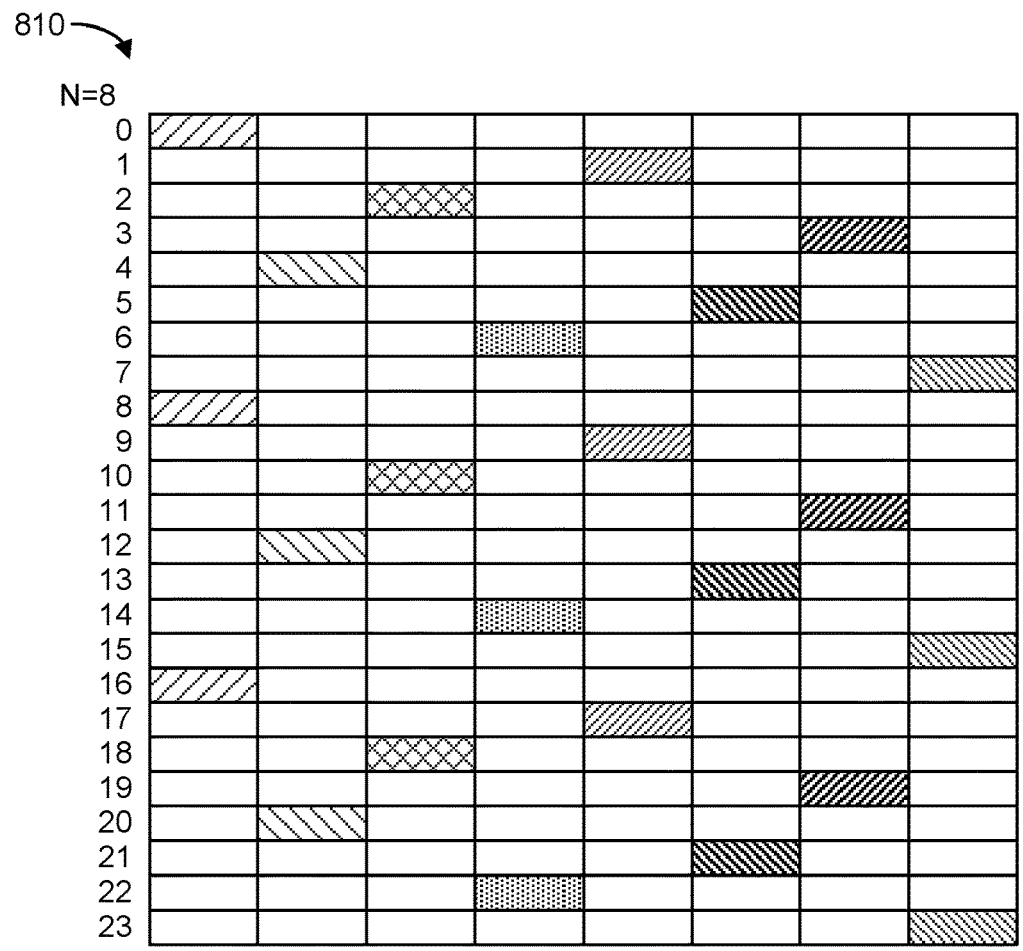
FIG. 8 illustrates some examples of different SRS stagger configurations for positioning.
Figure 8:
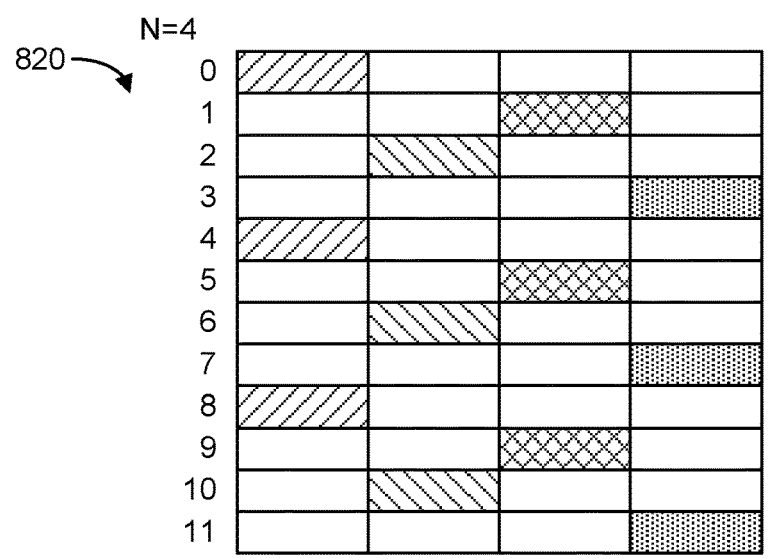

FIG. 8 illustrates some examples of different SRS stagger configurations for positioning. In order to avoid cross-correlation peaks cause by RE holes in the frequency domain, the number of SRS symbols can be equal to the comb-type with a deterministic sequence of shifts. Such sequence of shift is also helpful for the case of a UE in a high mobility scenario where the receiver may want to perform coherent combining only across a subset of OFDM symbols due to faster decorrelation. Ensuring that consecutive symbols contained subcarriers which are uniformly spaced would facility such block-based coherent processing of the SRS. As illustrated in FIG. 8, in some aspects, the SRS transmissions for positioning can be configured with staggered patterns (e.g., a collection of SRS symbols from the same antenna port with different offsets for at least some symbols) in a single SRS resource. For example, a staggering pattern for a comb-8 (e.g., N=8) is illustrated in chart 810. In this example, the frequency offset shift may be determined relative to the sequence of 0, 4, 2, 6, 1, 5, 3, 7. In another example, a staggering pattern for a comb-4 (e.g., N=4) is illustrated in chart 820. In this example, the frequency offset shift may be determined relative to the sequence of 0, 2, 1, 3.

According to various aspects disclosed herein, for positioning, the number of consecutive OFDM symbols in an SRS resource is configurable with one of the values in the set {1, 2, 4, 8, 12}. The RE pattern of an SRS resource for positioning is configured with a comb offset for the first symbol in an SRS resource. The relative RE offsets of following symbols are defined relative to the comb offset of the first symbol in the SRS resource. A relative RE offset of each of the following symbols is derived from the configured number of symbols for an SRS resource, the comb size for the SRS resource and the SRS symbol index within the SRS resource.

According to various aspects disclosed herein, configuration options are provided for the repetition factor and hopping for fully staggered SRS for positioning. In some aspects disclosed, the configuration options are designed to ensure that all subcarriers of one hop have been sounded (i.e., fully-staggered sounding) before the next hop occurs and to ensure that within one slot, for all the sounded hops, all subcarriers have been sounded. For SRS for positioning it is beneficial to sound all subcarriers of a hop (fully-staggered patterns), to ensure that no aliasing exists and a more robust channel estimation on the UL. Therefore, the principles for hopping for an SRS for positioning should not be to repeat the same subcarriers R times, but rather to repeat a fully-staggered pattern R times before moving to the next hop.

In contrast, some conventional configurations, with frequency hopping and repetition R, allow the same set of subcarriers to be sounded in R consecutive OFDM symbols before the next hop occurs, which does not ensure that all subcarriers of one hop have been sounded before the next hop occurs.

An example configuration for the repetition factor and hopping for fully staggered SRS for positioning is provided. For example, a UE may be configured for a comb-N SRS resource, spanning M symbols, a repetition factor of R, and B hops within a slot, where N*R*B=M, for M greater than 1. In the case of M=1 (i.e., one symbol SRS Resource), then R is always 1 and B=1 hop within a slot. The following FIGS. provide examples for comb-2 and an 8-symbol SRS resource, the following configurations allow for fully-staggered sounding for all sounded hops within a slot. One reason to ensure that a hop is fully staggered within a slot is that the UE cannot ensure phase continuity for any SRS symbols in another slot, for a receiver to coherently combine.

Figure 9:
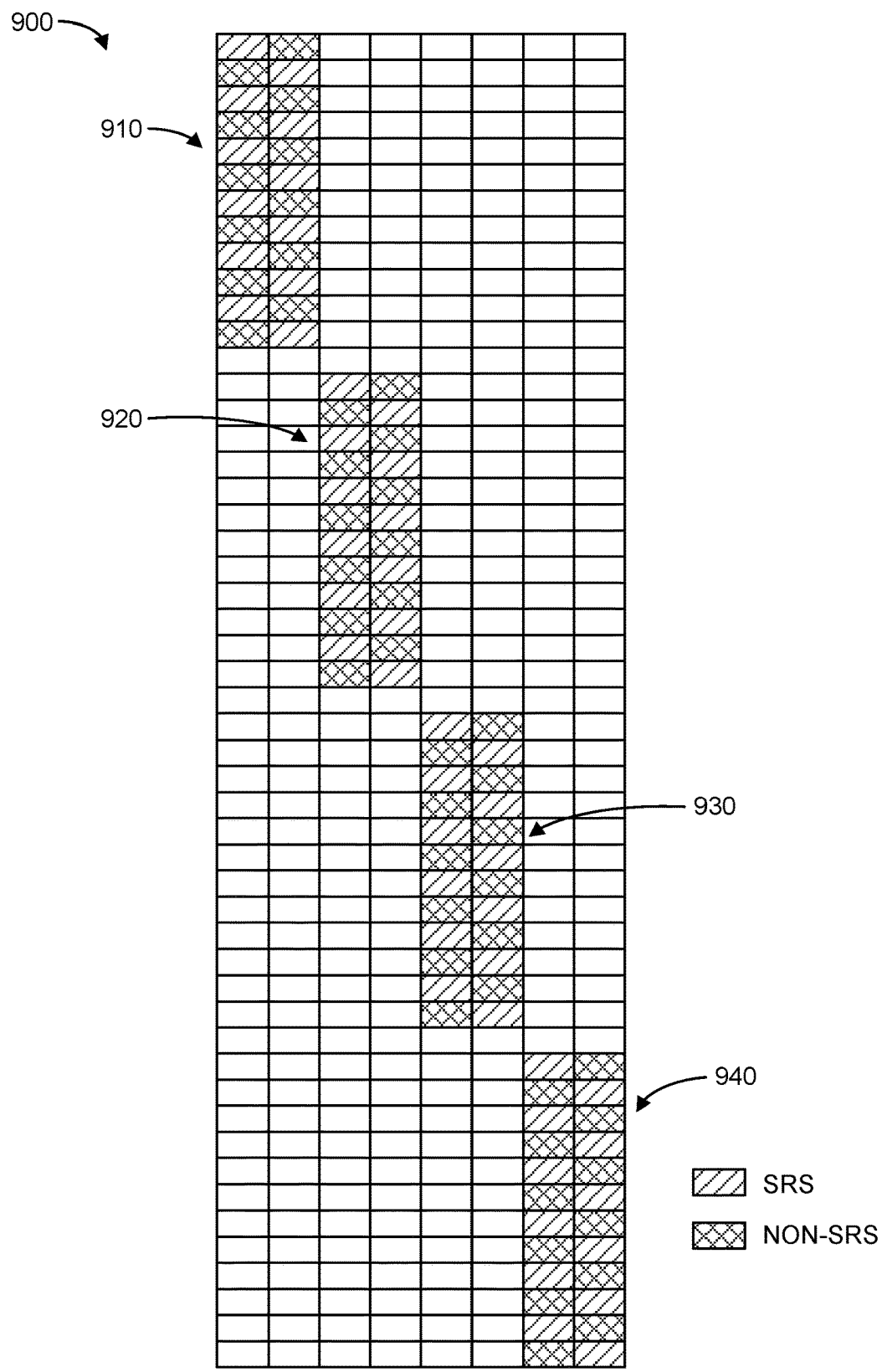
FIG. 9 illustrates an example of an SRS stagger configuration for positioning, according to aspects of the disclosure.

FIG. 9 illustrates an example of an SRS stagger configuration for positioning, according to various aspects disclosed herein. As illustrated, an SRS stagger configuration for comb-2 with 8 symbols and a repetition of 1 (R=1) and hops (B=4) is provided in 900. As illustrated, all subcarriers of the first hop 910 are sounded before the second hop 920. Likewise, all subcarriers of the second hop 920 are sounded before the third hop 930 and all subcarriers of the third hop 930 are sounded before the fourth hop 940, and all subcarriers of the fourth hop 940 are sounded before the end of a respective slot.

Figure 10:
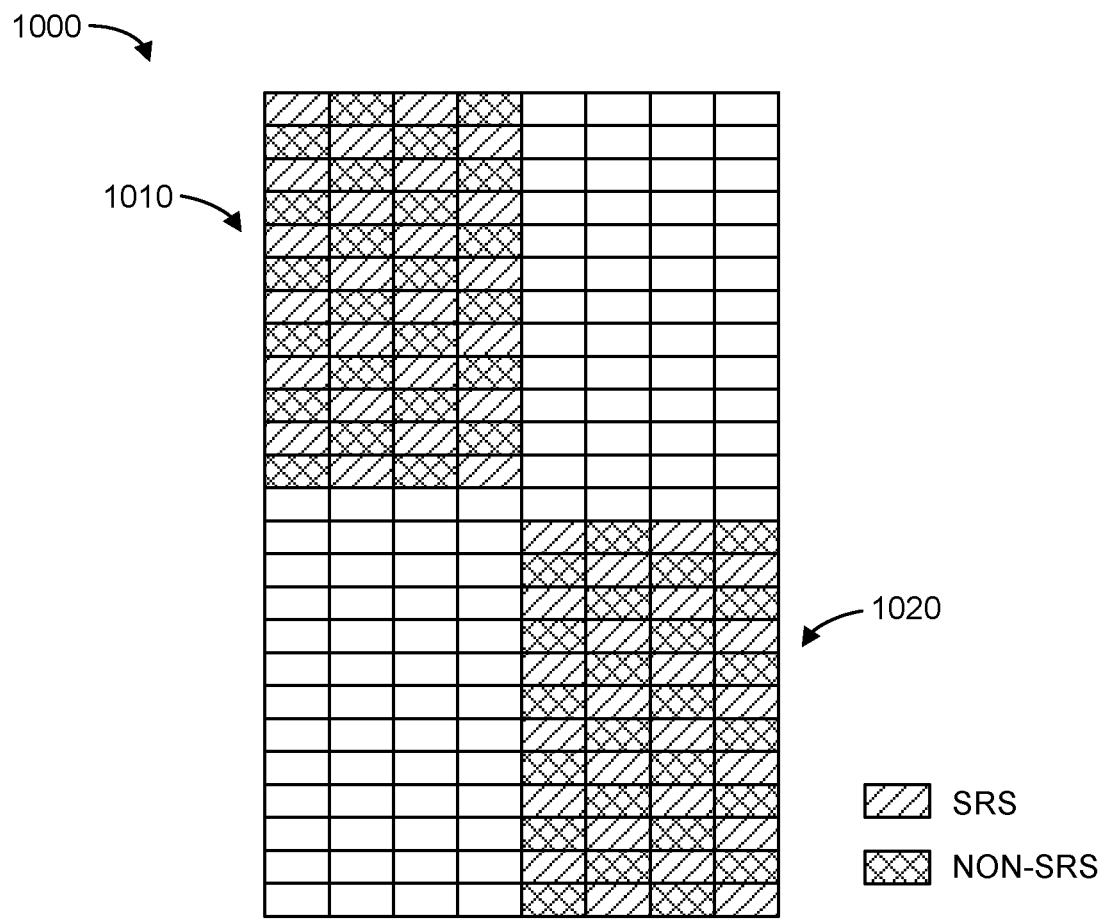
FIG. 10 illustrates an example of an SRS stagger configuration for positioning, according to aspects of the disclosure.

FIG. 10 illustrates an example of an SRS stagger configuration for positioning, according to various aspects disclosed herein. As illustrated, an SRS stagger configuration for comb-2 with 8 symbols and a repetition of 2 (R=2) and hops (B=2) is provided in 1000. As illustrated, all subcarriers of the first hop 1010 are sounded before the second hop 1020, and all subcarriers of the second hop 1020 are sounded before the end of a respective slot.

Figure 11:
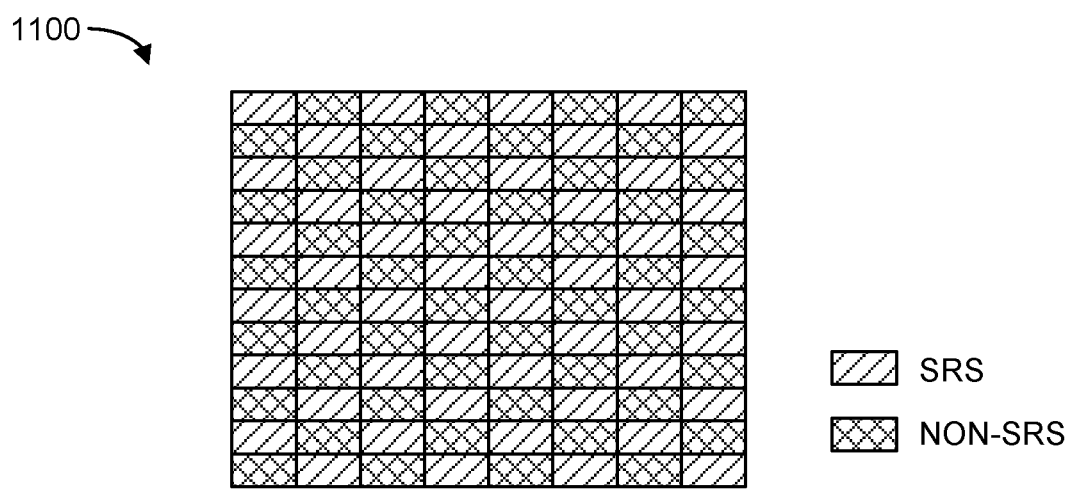
FIG. 11 illustrates an example of an SRS stagger configuration for positioning.

FIG. 11 illustrates an example of an SRS stagger configuration for positioning, according to various aspects disclosed herein. As illustrated, an SRS stagger configuration for comb-2 with 8 symbols and a repetition of 4 (R=4) and hops (B=1) is provided in 1100.

Figure 12:
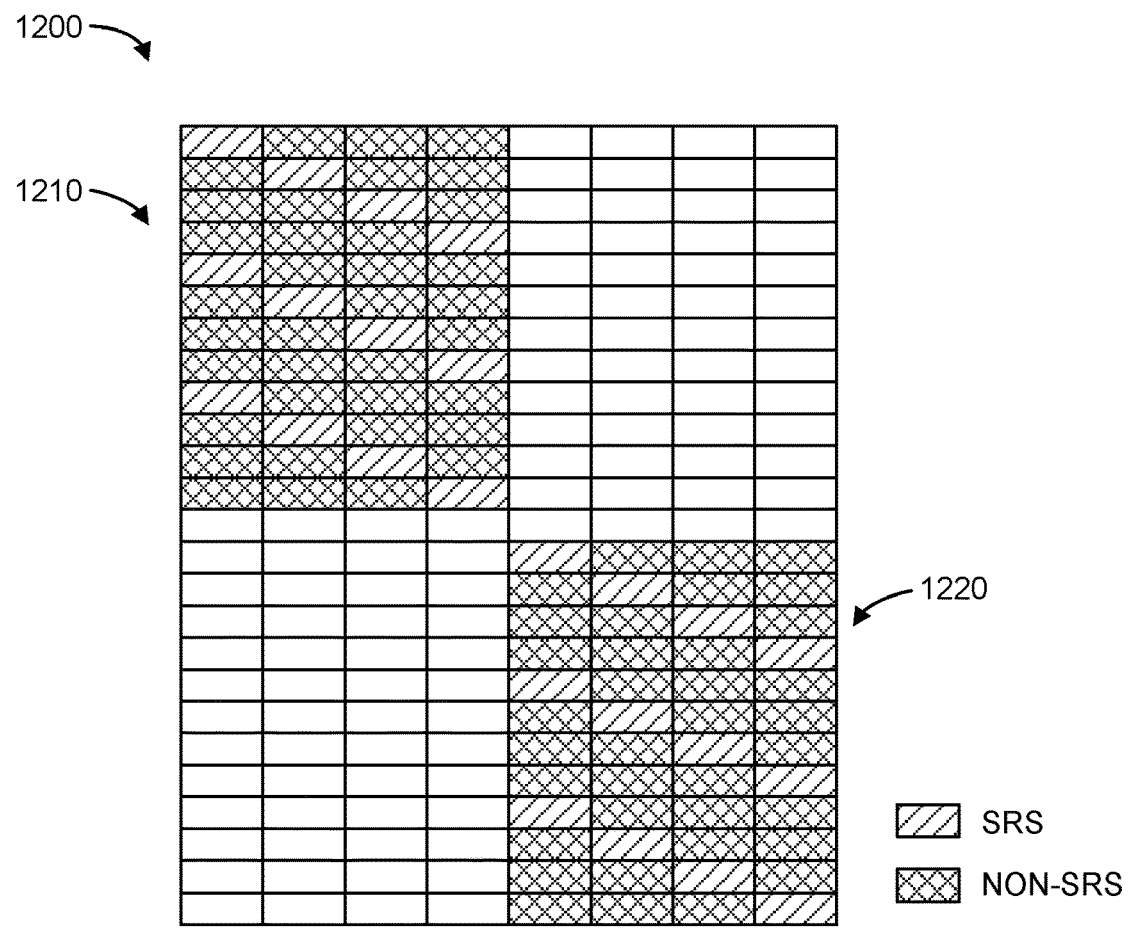
FIG. 12 illustrates an example of an SRS stagger configuration for positioning, according to aspects of the disclosure.

FIG. 12 illustrates an example of an SRS stagger configuration for positioning, according to various aspects disclosed herein. As illustrated, an SRS stagger configuration for comb-4 with 8 symbols and a repetition of 1 (R=1) and hops (B=2) is provided in 1200. As illustrated, all subcarriers of the first hop 1210 are sounded before the second hop 1220, and all subcarriers of the second hop 1220 are sounded before the end of a respective slot.

Figure 13:
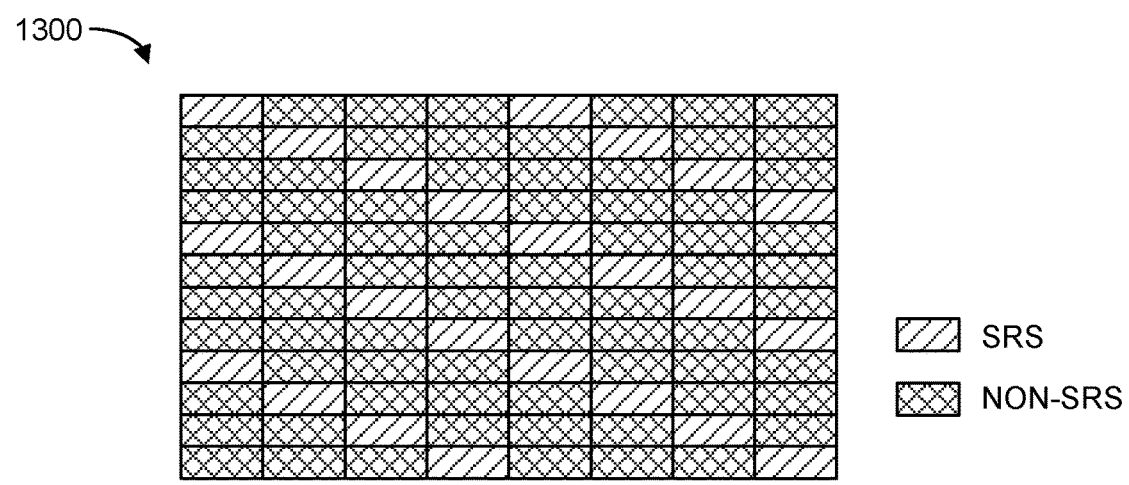
FIG. 13 illustrates an example of an SRS stagger configuration for positioning, according to aspects of the disclosure

FIG. 13 illustrates an example of an SRS stagger configuration for positioning, according to various aspects disclosed herein. As illustrated, an SRS stagger configuration for comb-4 with 8 symbols and a repetition of 2 (R=2) and hops (B=1) is provided in 1300.

Figures 14, 15:
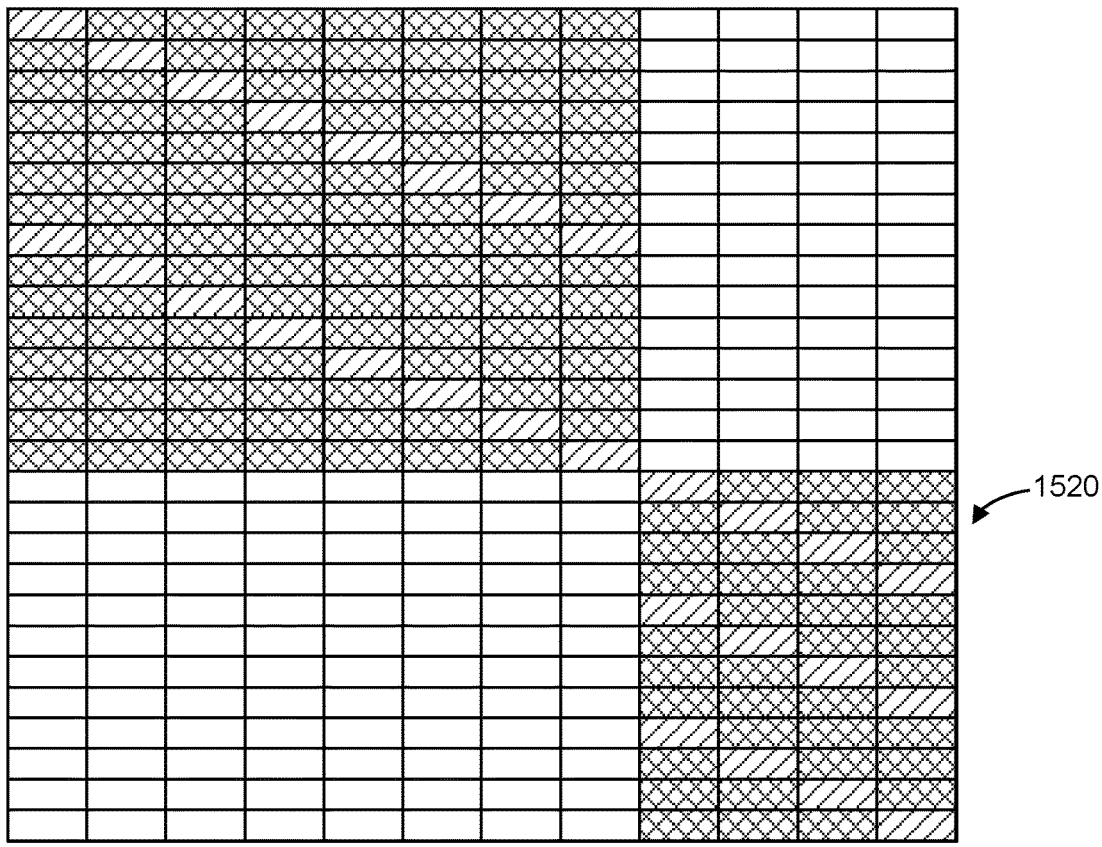
FIG. 14 illustrates an example of a table for various SRS stagger configurations for positioning, according to aspects of the disclosure
FIG. 15 illustrates an example of an SRS stagger configuration for positioning, according to aspects of the disclosure

FIG. 14 illustrates an example of a table 1400 for various SRS stagger configurations for positioning, according to various aspects disclosed herein. As illustrated, table 1400 contains various possible configurations for a comb-N and M symbols. For example as shown in table 1400, for N=2 and M=2, only a value of a repetition factor of 1 and 1 hop within a slot is available. However, for N=2 and M=8, repetition factor R and hops B have the options of R=1 and B=4, R=2 and B=2, or R=4 and B=1 are available. Additional values in the table 1400 can be used to satisfy the relationship of N*R*B=M, for M greater than 1, as note above. Accordingly, using the table 1400 and the relationship provided, it will be appreciate that other values for N, R, M and B can be determined from table 1400 or direct calculation. Generally, it will be appreciated that there are various configurations for a comb type of $K_{TC}=\{2, 4, 8\}$ SRS resource spanning $N_{symb}^{SRS}=\{1, 2, 4, 8, 12\}$ OFDM symbols within a slot, configuration of repetition of R={1, 2, 3, 4, 6} with $R \leq N_{symb}^{SRS}$ is possible with the following number $N_b$ of frequency hops within the $N_{symb}^{SRS}$ symbols of the SRS resource. A special case in the table occurs for N=8 ($K_{TC}=8$) and M=12 ($N_{symb}^{SRS}=12$), which is discussed below in relation to FIG. 15.

FIG. 15 illustrates an example of an SRS stagger configuration for positioning, according to various aspects disclosed herein. As illustrated, an SRS stagger configuration for comb-8 with 12 symbol SRS resource is provided in

1500. If as illustrated, the UE used the first 8 symbols in the first hop 1510, then it has only 4 symbols left to sound the second hop 1520. However, in that case, not all subcarriers of the second hop would be sounded if the comb-8 is maintained. To address this situation, some aspects disclosed herein include preventing hopping (i.e., no hopping is allowed in this case). Accordingly, B=1 always when N=8 and M=12. Alternatively, in the second hop 1520, the UE can use a comb-4 even though it used comb-8 in the first hop of the SRS resource. For example, assume the UE is configured with a RE-shift S={0, 1, 2 ..., 7} for the first hop, the shift that it uses in the 2nd hop can be modulo(S,4). In another alternative, according to some aspects disclosed herein, the UE can be configured with 2 comb-types and 2 RE-shifts so that it can used respectively in the 2 hops in the configurations where the equation of N*R*B>M is satisfied for M greater than 1 and B greater than 1. For example, in the case where M is equal to 12, R is equal to 1, B is equal to 2, then the comb-type can equal a first value (e.g., N) for a first hop and can equal a second value (e.g., N2) for a second hop. In the SRS stagger configuration in 1500, the alternative where in the second hop 1520, the UE uses a comb-4 even though it used comb-8 in the first hop 1510 of the SRS resource is illustrated. As can be seen, using the comb-4 in the second hop 1520 allows for the sounding reference signal (SRS) to be sounded on all subcarriers.

Figure 16:
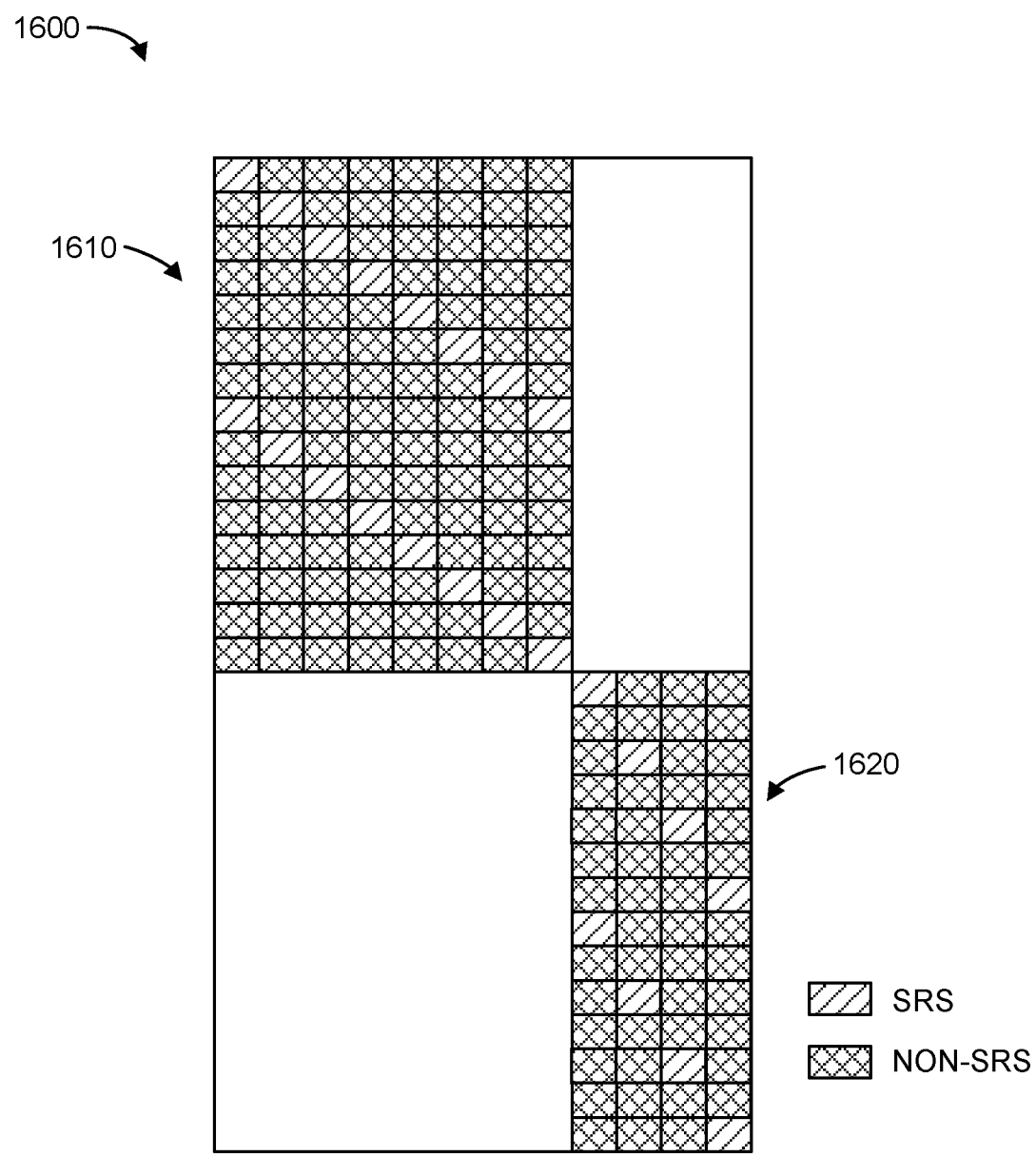
FIG. 16 illustrates an example of an SRS stagger configuration for positioning, according to aspects of the disclosure

FIG. 16 illustrates an example of an SRS stagger configuration for positioning, according to various aspects disclosed herein. For comb-N SRS resource, spanning M symbols, a repetition factor of R and B hops within a slot, the staggering pattern (the sequence of which RE-offsets are sounded across the consecutive symbols) in each hop depends on the number of OFDM symbols used to sound that specific hop with the same comb-N. As illustrated, an SRS stagger configuration for comb-8 with 12 symbol SRS resource is provided in 1600. In contrast to the prior aspects discussed, in this configuration each hop has the same comb-N (e.g., N=8 as illustrated). Since the UE uses the first 8 symbols in the first hop 1610, it has only 4 symbols left to sound the second hop 1620. Since comb-8 is maintained, not all subcarriers of the second hop 1620 are sounded. The general staircase pattern can be maintained, except that a subcarrier will be skipped between the symbols in the second hop 1620, as illustrated. For example, in the first hop 1610, a first staggering pattern can be a sequence of resource elements offsets incremented by 1 per OFDM symbol (e.g., 0, 1, 2 ... 7) and in the second hop 1620 a second staggering pattern is a sequence of resource elements offsets incremented by 2 per OFDM symbol (e.g., 0, 2, 4, 6). However, it will be appreciated that other patterns for the second hop 1620 can be configured and the various aspects disclosed herein are not limited to these examples. Chart 1600 illustrates the alternative where in the second hop 1620, the UE maintains its original comb-N configuration, even though the SRS will not be sounded on all subcarriers.

Figure 17:
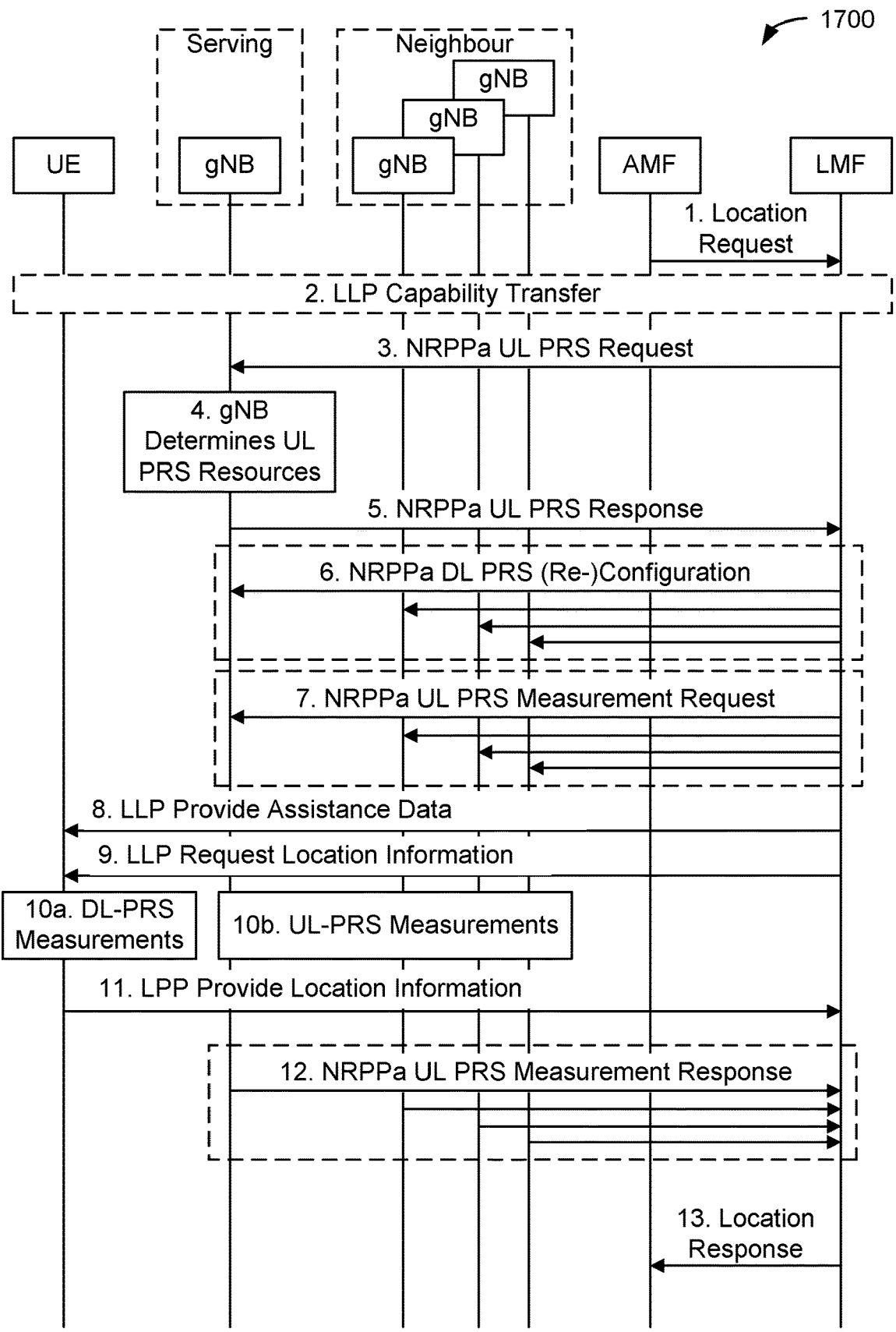
FIG. 17 is an LTE positioning protocol (LLP)-based diagram of SRS for positioning, according to aspects of the disclosure.

FIG. 17 is a diagram 1700 illustrating an LPP-based configuration of SRS for positioning, according to aspects of the disclosure.

Figure 18:
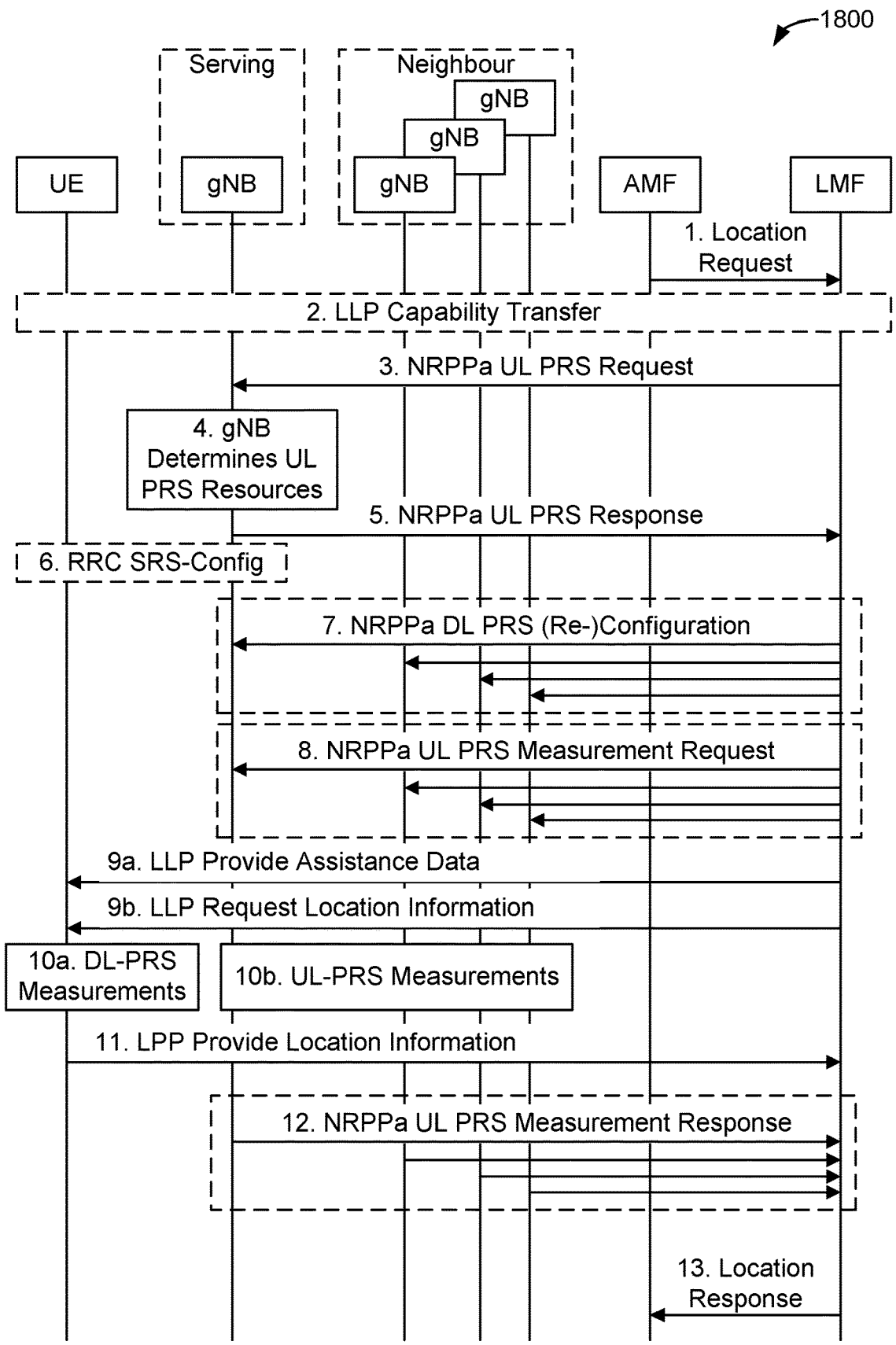
FIG. 18 is an RRC-based diagram of SRS for positioning, according to aspects of the disclosure.

FIG. 18 is a diagram 1800 illustrating an RRC-based configuration of SRS for positioning, according to aspects of the disclosure.

Accordingly, aspects of the present disclosure may facilitate SRS for positioning to be configured by RRC, LPP, or a combination thereof. One main reason to use RRC is that it can be backward compatible to legacy UEs when UTDOA is being used as a positioning method, In contrast, for an SRS used for positioning configured through LPP, the configurations/features not supported in RRC can be configured through LPP. For example, a UE configured with SRS resources used for multi-RTT would need to be configured with an SRS through LPP. As another example, configuring SRS resources with frequency domain staggering across consecutive OFDM symbols is possible if the SRS are configured through LPP. As another example, a higher number of SRS resource sets can be configured if LPP is used compared to the case that RRC is used. As still another example, an SRS configured in LPP can be transmitted simultaneously across multiple component carriers in one OFDM symbol, but not for an SRS configured in RRC. As another example, an SRS configured in LPP can be configured outside the BWPs of the component carrier, but not for an SRS configured in RRC. As a last example, SRS can be transmitted outside an active BWP of the component carrier if the SRS are configured through LPP.

Thus, if a UE supports configuring SRS for positioning via LPP, then the location server can configure the UE with SRS for positioning using LPP. But, if the UE is a legacy UE that does not support configuring SRS for positioning via LPP, then the location server can configure the UE with SRS for positioning using RRC. However, the parameters of the SRS configuration may be more restrictive for an RRC configuration than for an LPP configuration, as described above.

Figure 19:
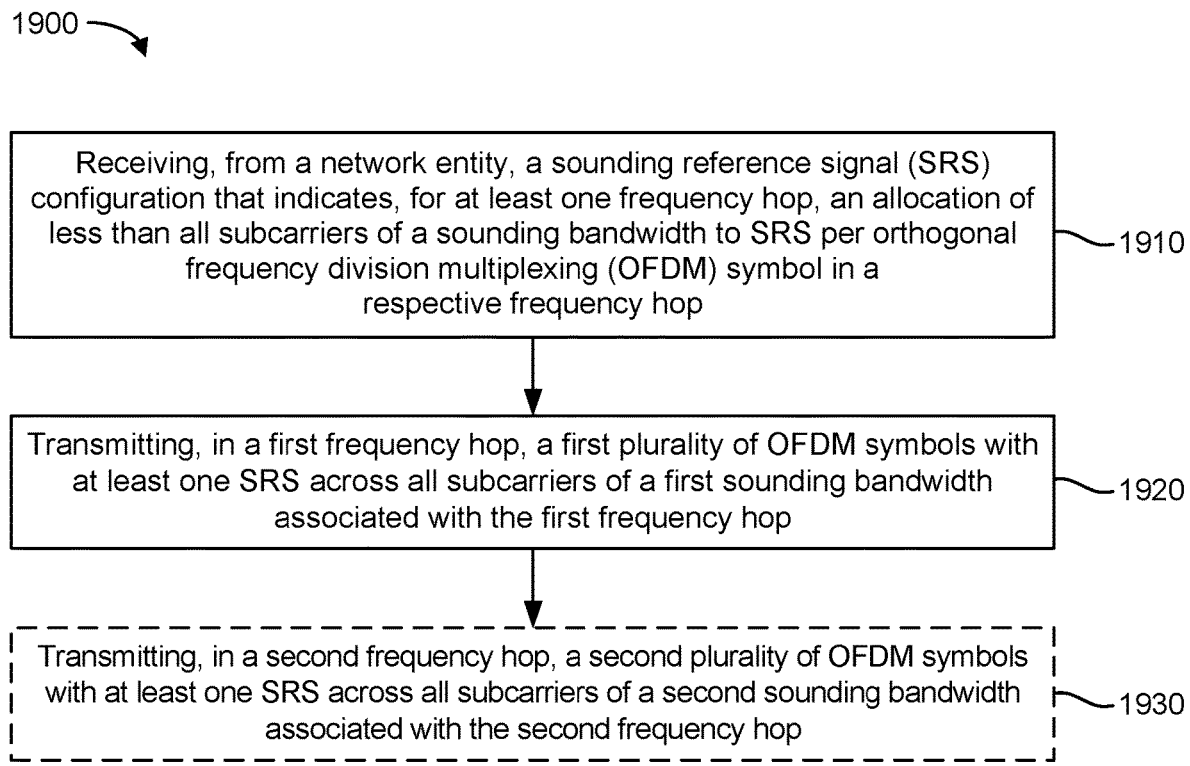
FIG. 19 illustrates an exemplary method of wireless communication, according to aspects of the disclosure.

FIG. 19 illustrates an exemplary method 1900 of wireless communication, according to aspects of the disclosure. The method 1900 may be performed by a UE (e.g., any of the UEs described herein).

At 1910, the UE (e.g., receiver 312, etc.) receives, from a network entity, a sounding reference signal (SRS) configuration that indicates, for at least one frequency hop, an allocation of less than all subcarriers of a sounding bandwidth to SRS per orthogonal frequency division multiplexing (OFDM) symbol in a respective frequency hop. At 1920, the UE (e.g., transmitter 310, etc.) transmits, in a first frequency hop, a first plurality of OFDM symbols with at least one SRS across all subcarriers of a first sounding bandwidth associated with the first frequency hop. In some aspects, transmitting the one or more SRS across all subcarriers in a first hop includes in a first consecutive collection of OFDM symbols of a slot. The UE (e.g., transmitter 310, etc.) may further, at 1930, optionally transmit, in a second frequency hop, a second plurality of OFDM symbols with at least one SRS across all subcarriers of a second sounding BW associated with the second frequency hop.

FIG. 20 illustrates an exemplary method 2000 of wireless communication, according to aspects of the disclosure. The method 2000 may be performed by a BS (e.g., any of the BSs described herein).

At 2010, the BS (e.g., transmitter 316, etc.) transmits, to a UE, a sounding reference signal (SRS) configuration that indicates, for at least one frequency hop, an allocation of less than all subcarriers of a sounding bandwidth to SRS per orthogonal frequency division multiplexing (OFDM) symbol in a respective frequency hop. In some designs, the SRS configuration may be relayed to the BS by a separate network entity and then transmitted by the BS at 2010, while in other designs the BS may both generate and transmit the SRS configuration at 2010. At 2020 (e.g., receiver 318, etc.), the BS receives, from the UE in a first frequency hop, a first plurality of OFDM symbols with at least one SRS across all subcarriers of a first sounding bandwidth associated with the first frequency hop. The BS (e.g., receiver 318, etc.) may further, at 2030, optionally receives, from the UE in a second frequency hop, a second plurality of OFDM symbols with at least one SRS across all subcarriers of a second sounding bandwidth associated with the second frequency hop.

Referring to FIGS. 19-20, in some designs, the first and/or second pluralities of OFDM symbols may each correspond to consecutive collections of OFDM symbols of a slot. Further, each of FIGS. 9-13 and 15 depicts an example SRS configuration (or SRS stagger configuration) that can be used as part of the method 1900 of FIG. 19 or the method 2000 of FIG. 20.

Referring to FIGS. 19-20, in some designs, the SRS configuration may designate or configure a comb-N SRS resource which spans M symbols with a repetition factor of R and B hops within a slot, satisfies the equation of $N*R*B=M$, for M greater than 1. In various aspects, for a comb-2 and 4 symbols, R is one of 1 or 2 and B is one of 1 or 2. According to other various aspects, for a comb-2 and 8 symbols, R is one of 1, 2 or 4 and B is one of 1, 2 or 4. According to other various aspects, for a comb-2 and 12 symbols, R is one of 1, 2, 4 or 6 and B is one of 1, 2, 4 or 6. According to other various aspects, for a comb-4 and 8 symbols, R is one of 1 or 2 and B is one of 1 or 2. According to other various aspects, for a comb-4 and 12 symbols, R is one of 1 or 3 and B is one of 1 or 3. In some aspects, it will be appreciated that M is greater than R and/or M is greater than B.

Referring to FIGS. 19-20, in some designs, the SRS configuration may designate or configure a comb-N SRS resource which spans M symbols with a repetition factor of R and B hops within a slot, satisfies the equation of $N*R*B>M$, for M greater than 1 and B greater than 1. For this configuration, in some aspects, B hops is set equal to 1, so there will be no hopping. In other aspects, the comb-N can be set to a new value of comb-N2, for a last hop, where value of N2 is less than N. For example, where M is equal to 12, R is equal to 1, B is equal to 2, N can be equal to 8 for a first hop and N2 can be equal to 4 for a second hop. In another aspect, two comb-types and two resource element shifts can be configured to be used in a first hop and a second hop, respectively.

Referring to FIGS. 19-20, in some designs, the SRS configuration may designate or configure two (or more) comb-types and two (or more) resource element offsets to be used in the first frequency hop and a second frequency hop, respectively.

FIG. 21 illustrates an exemplary method 2100 of wireless communication, according to aspects of the disclosure. The method 2100 may be performed by a UE (e.g., any of the UEs described herein).

At 2110, the UE receives (e.g., receiver 312, etc.), from a network entity (e.g., a serving TRP, a location server, or a location management function, etc.), a sounding reference signal (SRS) configuration that indicates, for each of a plurality of frequency hops associated with the same comb-type, a sequence of resource element offsets that is based on a number of OFDM symbols used in the respective frequency hop. At 2120 (e.g., transmitter 310, etc.), the UE transmits, in each of the plurality of frequency hops, a plurality of consecutive OFDM symbols with at least one SRS in accordance with the sequence of resource element offsets indicated by the SRS configuration for the respective frequency hop.

FIG. 22 illustrates an exemplary method 2200 of wireless communication, according to aspects of the disclosure. The method 2200 may be performed by a BS (e.g., any of the BSs described herein).

At 2210, the BS transmits (e.g., transmitter 316, etc.), to a user equipment (UE), a sounding reference signal (SRS) configuration that indicates, for each of a plurality of frequency hops associated with the same comb-type, a sequence of resource element offsets that is based on a number of OFDM symbols used in the respective frequency hop. In some designs, the SRS configuration may be relayed to the BS by a separate network entity and then transmitted by the BS at 2210, while in other designs the BS may both generate and transmit the SRS configuration at 2210. At 2220, the BS (e.g., receiver 318, etc.) receives, from the UE in each of the plurality of frequency hops, a plurality of consecutive OFDM symbols with at least one SRS in accordance with the sequence of resource element offsets indicated by the SRS configuration for the respective frequency hop.

Referring to FIGS. 21-22, FIG. 16 depicts an example SRS configuration (or SRS stagger configuration) that can be used as part of the method 2100 of FIG. 21 or the method 2200 of FIG. 22. In particular, the first and second hops 1610-1620 are associated with the same comb-type (i.e., comb-8), but the RE offsets are different in the first and second hops 1610-1620 (i.e., RE offset=1 for hop 1610, and RE offset=2 for hop 1620).

Referring to FIGS. 21-22, the SRS configuration may designate or configure a comb-N SRS resource which spans M symbols with a repetition factor of R and B hops within a slot, which satisfies the equation of $N*R*B>M$ for M greater than 1 and B greater than 1. In one example, M is equal to 12, R is equal to 1, B is equal to 2, N is equal to 8 and where 8 OFDM symbols are used in a first hop and 4 OFDM symbols are used in a second hop. Further, in the first hop, a first sequence of resource elements offsets may be incremented by 1 per OFDM symbol and in the second hop a second sequence of resource elements offsets may be incremented by 2 per OFDM symbol (see, e.g., FIG. 16).

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a DSP, an ASIC, an FPGA, or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method of wireless communication performed by a user equipment (UE), comprising:
receiving, from a network entity, a sounding reference signal (SRS) configuration that indicates, for at least one frequency hop, an allocation of less than all subcarriers of a sounding bandwidth for SRS per orthogonal frequency division multiplexing (OFDM) symbol in a respective frequency hop;
transmitting, in a first frequency hop in accordance with the SRS configuration, a first plurality of OFDM symbols with at least one SRS across all subcarriers of a first sounding bandwidth associated with the first frequency hop; and
transmitting, in a second frequency hop, a second plurality of OFDM symbols with at least one SRS across all subcarriers of a second sounding bandwidth associated with the second frequency hop.

2. The method of claim 1, wherein the first plurality of OFDM symbols correspond to a consecutive collection of OFDM symbols of a slot.

3. The method of claim 1,
wherein the first plurality of OFDM symbols correspond to a first consecutive collection of OFDM symbols of a slot, and
wherein the second plurality of OFDM symbols correspond to a second consecutive collection of OFDM symbols of the slot.

4. A method of wireless communication performed by a user equipment (UE), comprising:
receiving, from a network entity, a sounding reference signal (SRS) configuration that indicates, for at least one frequency hop, an allocation of less than all subcarriers of a sounding bandwidth for SRS per orthogonal frequency division multiplexing (OFDM) symbol in a respective frequency hop; and
transmitting, in a first frequency hop in accordance with the SRS configuration, a first plurality of OFDM symbols with at least one SRS across all subcarriers of a first sounding bandwidth associated with the first frequency hop,
wherein the SRS configuration indicates, for a first set of frequency hops in a slot, a comb-N SRS resource which spans M symbols with a repetition factor of R and B frequency hops within the slot, satisfies the equation of $N*R*B=M$, wherein M is greater than 1.

5. The method of claim 4,
wherein for a comb-2 with 4 symbols, R is one of 1 or 2 and B is one of 1 or 2, or
wherein for a comb-2 with 8 symbols, R is one of 1, 2 or 4 and B is one of 1, 2 or 4,
wherein for a comb-2 with 12 symbols, R is one of 1, 2, 4 or 6 and B is one of 1, 2, 4 or 6,
wherein for a comb-4 with 8 symbols, R is one of 1 or 2 and B is one of 1 or 2, or
wherein for a comb-4 and 12 symbols, R is one of 1 or 3 and B is one of 1 or 3.

6. The method of claim 4,
wherein M is greater than R, or
wherein M is greater than B, or
a combination thereof.

7. The method of claim 4, wherein the SRS configuration further, for a second set of frequency hops in a slot, one or more modified values for one or more of N, R, B and/or M.

8. The method of claim 7, wherein the SRS configuration sets comb-N to a new value of comb-N2, for a last frequency hop in the slot, where value of N2 is less than N.

9. The method of claim 8, wherein M is equal to 12, R is equal to 1, B is equal to 2, N is equal to 8 for the first set of frequency hops in the slot and N2 is equal to 4 for the last frequency hop in the slot.

10. The method of claim 4, wherein the SRS configuration further configures two comb-types and two resource element offsets to be used in the first frequency hop and a second frequency hop, respectively.

11. The method of claim 1, wherein the network entity is one of a serving TRP, a location server, or a location management function.

12. A method of wireless communication performed by a base station (BS), comprising:
transmitting, to a user equipment (UE), a sounding reference signal (SRS) configuration that indicates, for at least one frequency hop, an allocation of less than all subcarriers of a sounding bandwidth for SRS per orthogonal frequency division multiplexing (OFDM) symbol in a respective frequency hop;
receiving, from the UE in a first frequency hop, a first plurality of OFDM symbols with at least one SRS across all subcarriers of a first sounding bandwidth associated with the first frequency hop; and
receiving, from the UE in a second frequency hop, a second plurality of OFDM symbols with at least one SRS across all subcarriers of a second sounding bandwidth associated with the second frequency hop.

13. The method of claim 12, wherein the first plurality of OFDM symbols correspond to a consecutive collection of OFDM symbols of a slot.

14. The method of claim 12,
wherein the first plurality of OFDM symbols correspond to a first consecutive collection of OFDM symbols of a slot, and
wherein the second plurality of OFDM symbols correspond to a second consecutive collection of OFDM symbols of the slot.

15. A method of wireless communication performed by a base station (BS), comprising:
transmitting, to a user equipment (UE), a sounding reference signal (SRS) configuration that indicates, for at least one frequency hop, an allocation of less than all subcarriers of a sounding bandwidth for SRS per orthogonal frequency division multiplexing (OFDM) symbol in a respective frequency hop; and
receiving, from the UE in a first frequency hop, a first plurality of OFDM symbols with at least one SRS across all subcarriers of a first sounding bandwidth associated with the first frequency hop,
wherein the SRS configuration indicates, for a first set of frequency hops in a slot, a comb-N SRS resource which spans M symbols with a repetition factor of R and B frequency hops within the slot, satisfies the equation of $N*R*B=M$, wherein M is greater than 1.

16. The method of claim 15,
wherein for a comb-2 with 4 symbols, R is one of 1 or 2 and B is one of 1 or 2, or
wherein for a comb-2 with 8 symbols, R is one of 1, 2 or 4 and B is one of 1, 2 or 4,
wherein for a comb-2 with 12 symbols, R is one of 1, 2, 4 or 6 and B is one of 1, 2, 4 or 6,
wherein for a comb-4 with 8 symbols, R is one of 1 or 2 and B is one of 1 or 2, or
wherein for a comb-4 and 12 symbols, R is one of 1 or 3 and B is one of 1 or 3.

17. The method of claim 15,
wherein M is greater than R, or
wherein M is greater than B, or
a combination thereof.

18. The method of claim 15, wherein the SRS configuration further, for a second set of frequency hops in a slot, one or more modified values for one or more of N, R, B and/or M.

19. A method of wireless communication performed by a user equipment (UE), comprising:
receiving, from a network entity, a sounding reference signal (SRS) configuration that indicates, for each of a plurality of frequency hops associated with the same comb-type, a sequence of resource element offsets that is based on a number of orthogonal frequency division multiplexing (OFDM) symbols used in the respective frequency hop; and
transmitting, in each of the plurality of frequency hops, a plurality of consecutive OFDM symbols with at least one SRS in accordance with the sequence of resource element offsets indicated by the SRS configuration for the respective frequency hop.

20. The method of claim 19, wherein the SRS configuration is for a comb-N SRS resource that spans M symbols with a repetition factor of R and B hops within a slot, satisfies the equation of $N*R*B>M$, wherein M is greater than 1 and B is greater than 1.

21. The method of claim 20, wherein M is equal to 12, R is equal to 1, B is equal to 2, N is equal to 8 and where 8 OFDM symbols are used in a first frequency hop and 4 OFDM symbols are used in a second frequency hop.

22. The method of claim 19,
wherein, in a first frequency hop, a first sequence of resource elements offsets is used whereby a resource element position is incremented by a first number of resource elements per OFDM symbol, and
wherein, in a second frequency hop, a second sequence of resource elements offsets is used whereby a resource element position is incremented by a second number of resource elements per OFDM symbol.

23. The method of claim 22,
wherein the first number of resource elements is one and the second number of resource elements is two, or
wherein the first number of resource elements is two and the second number of resource elements is one.

24. A method of wireless communication performed by a base station (BS), comprising:
transmitting, to a user equipment (UE), a sounding reference signal (SRS) configuration that indicates, for each of a plurality of frequency hops associated with the same comb-type, a sequence of resource element offsets that is based on a number of orthogonal frequency division multiplexing (OFDM) symbols used in the respective frequency hop; and
receiving, from the UE in each of the plurality of frequency hops, a plurality of consecutive OFDM symbols with at least one SRS in accordance with the sequence of resource element offsets indicated by the SRS configuration for the respective frequency hop.

25. The method of claim 24, wherein the SRS configuration is for a comb-N SRS resource that spans M symbols with a repetition factor of R and B hops within a slot, satisfies the equation of $N*R*B>M$, wherein M is greater than 1 and B is greater than 1.

26. The method of claim 25, wherein M is equal to 12, R is equal to 1, B is equal to 2, N is equal to 8 and where 8

OFDM symbols are used in a first frequency hop and 4 OFDM symbols are used in a second frequency hop.

27. The method of claim 24,
wherein, in a first frequency hop, a first sequence of resource elements offsets is used whereby a resource element position is incremented by a first number of resource elements per OFDM symbol, and
wherein, in a second frequency hop, a second sequence of resource elements offsets is used whereby a resource element position is incremented by a second number of resource elements per OFDM symbol.

28. The method of claim 27,
wherein the first number of resource elements is one and the second number of resource elements is two, or
wherein the first number of resource elements is two and the second number of resource elements is one.

29. A user equipment (UE), comprising:
means for receiving, from a network entity, a sounding reference signal (SRS) configuration that indicates, for at least one frequency hop, an allocation of less than all subcarriers of a sounding bandwidth for SRS per orthogonal frequency division multiplexing (OFDM) symbol in a respective frequency hop;
means for transmitting, in a first frequency hop in accordance with the SRS configuration, a first plurality of OFDM symbols with at least one SRS across all subcarriers of a first sounding bandwidth associated with the first frequency hop; and
means for transmitting, in a second frequency hop, a second plurality of OFDM symbols with at least one SRS across all subcarriers of a second sounding bandwidth associated with the second frequency hop.

30. A base station (BS), comprising:
means for transmitting, to a user equipment (UE), a sounding reference signal (SRS) configuration that indicates, for at least one frequency hop, an allocation of less than all subcarriers of a sounding bandwidth for SRS per orthogonal frequency division multiplexing (OFDM) symbol in a respective frequency hop;
means for receiving, from the UE in a first frequency hop, a first plurality of OFDM symbols with at least one SRS across all subcarriers of a first sounding bandwidth associated with the first frequency hop; and
means for receiving, from the UE in a second frequency hop, a second plurality of OFDM symbols with at least one SRS across all subcarriers of a second sounding BW associated with the second frequency hop.

31. A user equipment (UE), comprising:
means for receiving, from a network entity, a sounding reference signal (SRS) configuration that indicates, for each of a plurality of frequency hops associated with the same comb-type, a sequence of resource element offsets that is based on a number of orthogonal frequency division multiplexing (OFDM) symbols used in the respective frequency hop; and
means for transmitting, in each of the plurality of frequency hops, a plurality of consecutive OFDM symbols with at least one SRS in accordance with the sequence of resource element offsets indicated by the SRS configuration for the respective frequency hop.

32. A base station (BS), comprising:
means for transmitting, to a user equipment (UE), a sounding reference signal (SRS) configuration that indicates, for each of a plurality of frequency hops associated with the same comb-type, a sequence of resource element offsets that is based on a number of orthogonal frequency division multiplexing (OFDM) symbols used in the respective frequency hop; and
means for receiving, from the UE in each of the plurality of frequency hops, a plurality of consecutive OFDM symbols with at least one SRS in accordance with the sequence of resource element offsets indicated by the SRS configuration for the respective frequency hop.

33. A user equipment (UE), comprising:
a memory;
at least one transceiver; and
at least one processor communicatively coupled to the memory and the at least one transceiver, the at least one processor configured to:
receive, from a network entity, a sounding reference signal (SRS) configuration that indicates, for at least one frequency hop, an allocation of less than all subcarriers of a sounding bandwidth for SRS per orthogonal frequency division multiplexing (OFDM) symbol in a respective frequency hop;
transmit, in a first frequency hop in accordance with the SRS configuration, a first plurality of OFDM symbols with at least one SRS across all subcarriers of a first sounding bandwidth associated with the first frequency hop; and
transmit, in a second frequency hop, a second plurality of OFDM symbols with at least one SRS across all subcarriers of a second sounding bandwidth associated with the second frequency hop.

34. A base station (BS), comprising:
a memory;
at least one transceiver; and
at least one processor communicatively coupled to the memory and the at least one transceiver, the at least one processor configured to:
transmit, to a user equipment (UE), a sounding reference signal (SRS) configuration that indicates, for at least one frequency hop, an allocation of less than all subcarriers of a sounding bandwidth for SRS per orthogonal frequency division multiplexing (OFDM) symbol in a respective frequency hop;
receive, from the UE in a first frequency hop, a first plurality of OFDM symbols with at least one SRS across all subcarriers of a first sounding bandwidth associated with the first frequency hop; and
receive, from the UE in a second frequency hop, a second plurality of OFDM symbols with at least one SRS across all subcarriers of a second sounding bandwidth associated with the second frequency hop.

35. A user equipment (UE), comprising:
a memory;
at least one transceiver; and
at least one processor communicatively coupled to the memory and the at least one transceiver, the at least one processor configured to:
receive, from a network entity, a sounding reference signal (SRS) configuration that indicates, for each of a plurality of frequency hops associated with the same comb-type, a sequence of resource element offsets that is based on a number of orthogonal frequency division multiplexing (OFDM) symbols used in the respective frequency hop; and
transmit, in each of the plurality of frequency hops, a plurality of consecutive OFDM symbols with at least one SRS in accordance with the sequence of resource element offsets indicated by the SRS configuration for the respective frequency hop.

36. A base station (BS), comprising:
a memory;
at least one transceiver; and
at least one processor communicatively coupled to the memory and the at least one transceiver, the at least one processor configured to:
  transmit, to a user equipment (UE), a sounding reference signal (SRS) configuration that indicates, for each of a plurality of frequency hops associated with the same comb-type, a sequence of resource element offsets that is based on a number of orthogonal frequency division multiplexing (OFDM) symbols used in the respective frequency hop; and
  receive, from the UE in each of the plurality of frequency hops, a plurality of consecutive OFDM symbols with at least one SRS in accordance with the sequence of resource element offsets indicated by the SRS configuration for the respective frequency hop.

37. A non-transitory computer-readable medium containing instructions stored thereon, for causing at least one processor in a user equipment (UE) to:
  receive, from a network entity, a sounding reference signal (SRS) configuration that indicates, for at least one frequency hop, an allocation of less than all subcarriers of a sounding bandwidth for SRS per orthogonal frequency division multiplexing (OFDM) symbol in a respective frequency hop;
  transmit, in a first frequency hop in accordance with the SRS configuration, a first plurality of OFDM symbols with at least one SRS across all subcarriers of a first sounding bandwidth associated with the first frequency hop; and
  transmit, in a second frequency hop, a second plurality of OFDM symbols with at least one SRS across all subcarriers of a second sounding bandwidth associated with the second frequency hop.

38. A non-transitory computer-readable medium containing instructions stored thereon, for causing at least one processor in a base station to:
  transmit, to a user equipment (UE), a sounding reference signal (SRS) configuration that indicates, for at least one frequency hop, an allocation of less than all subcarriers of a sounding bandwidth for SRS per orthogonal frequency division multiplexing (OFDM) symbol in a respective frequency hop; and
  receive, from the UE in a first frequency hop, a first plurality of OFDM symbols with at least one SRS across all subcarriers of a first sounding bandwidth associated with the first frequency hop; and
  receive, from the UE in a second frequency hop, a second plurality of OFDM symbols with at least one SRS across all subcarriers of a second sounding bandwidth associated with the second frequency hop.

39. A non-transitory computer-readable medium containing instructions stored thereon, for causing at least one processor in a user equipment (UE) to:
  receive, from a network entity, a sounding reference signal (SRS) configuration that indicates, for each of a plurality of frequency hops associated with the same comb-type, a sequence of resource element offsets that is based on a number of orthogonal frequency division multiplexing (OFDM) symbols used in the respective frequency hop; and
  transmit, in each of the plurality of frequency hops, a plurality of consecutive OFDM symbols with at least one SRS in accordance with the sequence of resource element offsets indicated by the SRS configuration for the respective frequency hop.

40. A non-transitory computer-readable medium containing instructions stored thereon, for causing at least one processor in a base station to:
  transmit, to a user equipment (UE), a sounding reference signal (SRS) configuration that indicates, for each of a plurality of frequency hops associated with the same comb-type, a sequence of resource element offsets that is based on a number of orthogonal frequency division multiplexing (OFDM) symbols used in the respective frequency hop; and
  receive, from the UE in each of the plurality of frequency hops, a plurality of consecutive OFDM symbols with at least one SRS in accordance with the sequence of resource element offsets indicated by the SRS configuration for the respective frequency hop.

* * * * *